(12) United States Patent
Kim

(10) Patent No.: US 12,335,620 B2
(45) Date of Patent: Jun. 17, 2025

(54) METHOD FOR PROVIDING IMAGE USING ZOOM REGION AND ELECTRONIC DEVICE SUPPORTING SAME

(71) Applicant: SAMSUNG ELECTRONICS CO., LTD., Suwon-si (KR)

(72) Inventor: Kyuwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 127 days.

(21) Appl. No.: 18/094,665

(22) Filed: Jan. 9, 2023

(65) Prior Publication Data

US 2023/0164442 A1 May 25, 2023

Related U.S. Application Data

(63) Continuation of application No. PCT/KR2021/007513, filed on Jun. 15, 2021.

(30) Foreign Application Priority Data

Jul. 9, 2020 (KR) ........................ 10-2020-0084532

(51) Int. Cl.
*H04N 23/69* (2023.01)
*G06T 7/62* (2017.01)
(Continued)

(52) U.S. Cl.
CPC ............... *H04N 23/69* (2023.01); *G06T 7/62* (2017.01); *G06T 7/70* (2017.01); *G10L 25/78* (2013.01);
(Continued)

(58) Field of Classification Search
CPC ...... H04N 23/69; H04N 23/611; H04N 23/61; H04N 23/635; H04N 23/695;
(Continued)

(56) References Cited

U.S. PATENT DOCUMENTS 9,781,350 B2 * 10/2017 Gao ........................ G06T 7/337
2003/0035051 A1 2/2003 Cho et al.
(Continued)

FOREIGN PATENT DOCUMENTS

CN 105740757 7/2016
CN 106713747 5/2017
(Continued)

OTHER PUBLICATIONS

International Search Report dated Sep. 13, 2021 issued in PCT/KR2021/007513 and English-language translation (5 pages).
(Continued)

*Primary Examiner* — Ahmed A Berhan
(74) *Attorney, Agent, or Firm* — Nixon & Vanderhye, P.C.

(57) ABSTRACT

An example electronic device includes a camera module, a processor functionally connected to the camera module, and a memory functionally connected to the processor, wherein the memory may store instructions which, when executed, cause the processor to: obtain a first image; identify a first object in the first image; obtain a parameter associated with a zoom area on the basis of a movement of the first object in the first image; identify the first object corresponding to a second object included in a second image obtained via the camera module, and obtain an image of the second object from the second image on the basis of the parameter associated with the zoom area.

18 Claims, 16 Drawing Sheets

(51) Int. Cl.
  *G06T 7/70* (2017.01)
  *G10L 25/78* (2013.01)
  *H04N 23/611* (2023.01)

(52) U.S. Cl.
  CPC .. *H04N 23/611* (2023.01); *G06T 2207/30196* (2013.01)

(58) Field of Classification Search
  CPC ...... H04N 23/631; H04N 23/661; G06T 7/62; G06T 7/70; G06T 2207/30196; G10L 25/78; G10L 17/00; G10L 25/06; G10L 25/57
  See application file for complete search history.

(56) References Cited

U.S. PATENT DOCUMENTS

| | | | | |
|---|---|---|---|---|
| 2010/0110266 | A1* | 5/2010 | Lee | H04N 23/611 348/333.02 |
| 2013/0120617 | A1 | 5/2013 | Kim | |
| 2015/0296317 | A1 | 10/2015 | Park et al. | |
| 2016/0021315 | A1 | 1/2016 | Tsubusaki | |
| 2016/0191810 | A1* | 6/2016 | Tsubusaki | G02B 27/646 348/240.1 |
| 2017/0094184 | A1 | 3/2017 | Gao et al. | |
| 2017/0272661 | A1 | 9/2017 | Tsubusaki | |
| 2019/0020823 | A1 | 1/2019 | Jeon | |
| 2019/0037143 | A1 | 1/2019 | Tsubusaki | |
| 2019/0304137 | A1* | 10/2019 | Campbell | G06V 20/52 |
| 2021/0099641 | A1 | 4/2021 | Mori | |

FOREIGN PATENT DOCUMENTS

| | | |
|---|---|---|
| CN | 106961552 | 7/2017 |
| JP | 2011-066828 | 3/2011 |
| JP | 2012-205059 | 10/2012 |
| JP | 2016-122874 | 7/2016 |
| JP | 2017-167438 | 3/2017 |
| KR | 10-2003-0013092 | 2/2003 |
| KR | 10-2010-0048600 | 5/2010 |
| KR | 10-2010-0115574 | 10/2010 |
| KR | 10-2015-118855 | 10/2015 |
| KR | 10-2018-0051643 | 5/2018 |

OTHER PUBLICATIONS

Written Opinion of ISA dated Sep. 10, 2021 issued in PCT/KR2021/007513 (4 pages).
Extended Search Report dated Oct. 26, 2023 in European Patent Application No. 21838021.0.
Office Action dated Feb. 7, 2025 in Korean Patent Application No. 10-2020-0084532 and English-language translation.
Office Action dated Mar. 28, 2025 in Chinese Application No. 202180048915.8 and English-language translation.

* cited by examiner

METHOD FOR PROVIDING IMAGE USING ZOOM REGION AND ELECTRONIC DEVICE SUPPORTING SAME

CROSS-REFERENCE TO RELATED APPLICATIONS

This application is a continuation of International Application No. PCT/KR2021/007513, designating the United States, filed on Jun. 15, 2021, in the Korean Intellectual Property Receiving Office and claiming priority to Korean Patent Application No. KR 10-2020-0084532, filed on Jul. 9, 2020, in the Korean Intellectual Property Office, the disclosures of each of which are incorporated by reference herein in their entireties.

BACKGROUND

Field

The disclosure relates to a method for providing an image, and an electronic device supporting the same.

Description of Related Art

A user of an electronic device such as a smartphone captures an image using a camera and shares the captured image with other users. For example, the electronic device may track movement (e.g., movement of a dancing subject) of a subject (e.g., a person) using a camera to acquire an image. The user of the electronic device may repeatedly capture an image to capture a desired image. When an image desired by the user is captured, the electronic device may enable the user to upload the captured image to a server providing an image sharing service by allowing the user to share the captured image with other users.

The electronic device may acquire an image centered on an object corresponding to a subject to be captured. The electronic device may configure a zoom region to acquire an image in which background other than the object is excluded from the image as much as possible to allow the object to be displayed in an appropriate size. The electronic device may acquire an image including the object by enlarging (zoom-in) or reducing (zoom-out) a zoom region.

SUMMARY

Various example embodiments of the disclosure relate to a method for providing a video, and an electronic device for supporting the same, which may enable a video related to an object to be acquired more naturally and accurately by acquiring a parameter related to a zoom region to be applied to a video to be acquired through a camera, based on information on the movement of an object included in a pre-recorded (e.g., pre-stored) video, and applying a parameter related to a zoom region acquired from a video currently being recorded.

The technical problems to be solved by the disclosure are not limited to the technical problems mentioned above, and other unmentioned technical problems solved by the technology in the disclosure will be clearly understood by those of ordinary skill in the art to which the disclosure belongs from the following description.

An electronic device according to various embodiments of the disclosure may include a camera module, a processor functionally connected to the camera module, and a memory functionally connected to the processor, wherein the memory may store instructions which, when executed, cause the processor to: acquire a first video, identify a first object in the first video, acquire a parameter related to a zoom region, based on the movement of the first object in the first video, identify the first object corresponding to a second object included in a second video acquired through the camera module, and acquire a video of the second object from the second video, based on the parameter related to the zoom region.

A method for providing a video in an electronic device according to various embodiments of the disclosure may include acquiring a first video, identifying a first object in the first video, acquiring a parameter related to a zoom region, based on the movement of the first object in the first video, identifying the first object corresponding to a second object included in a second video acquired through a camera module of the electronic device, and acquiring a video of the second object from the second video, based on the parameter related to the zoom region.

A method for providing a video, and an electronic device for supporting the same according to various embodiments of the disclosure may, for example, enable a video related to an object to be acquired more naturally and accurately by acquiring a parameter related to a zoom region to be applied to a video to be acquired through a camera, based on information on the movement of an object included in a pre-recorded (e.g., pre-stored) video, and applying a parameter related to a zoom region acquired from a video currently being recorded.

DETAILED DESCRIPTION

Figure 1:
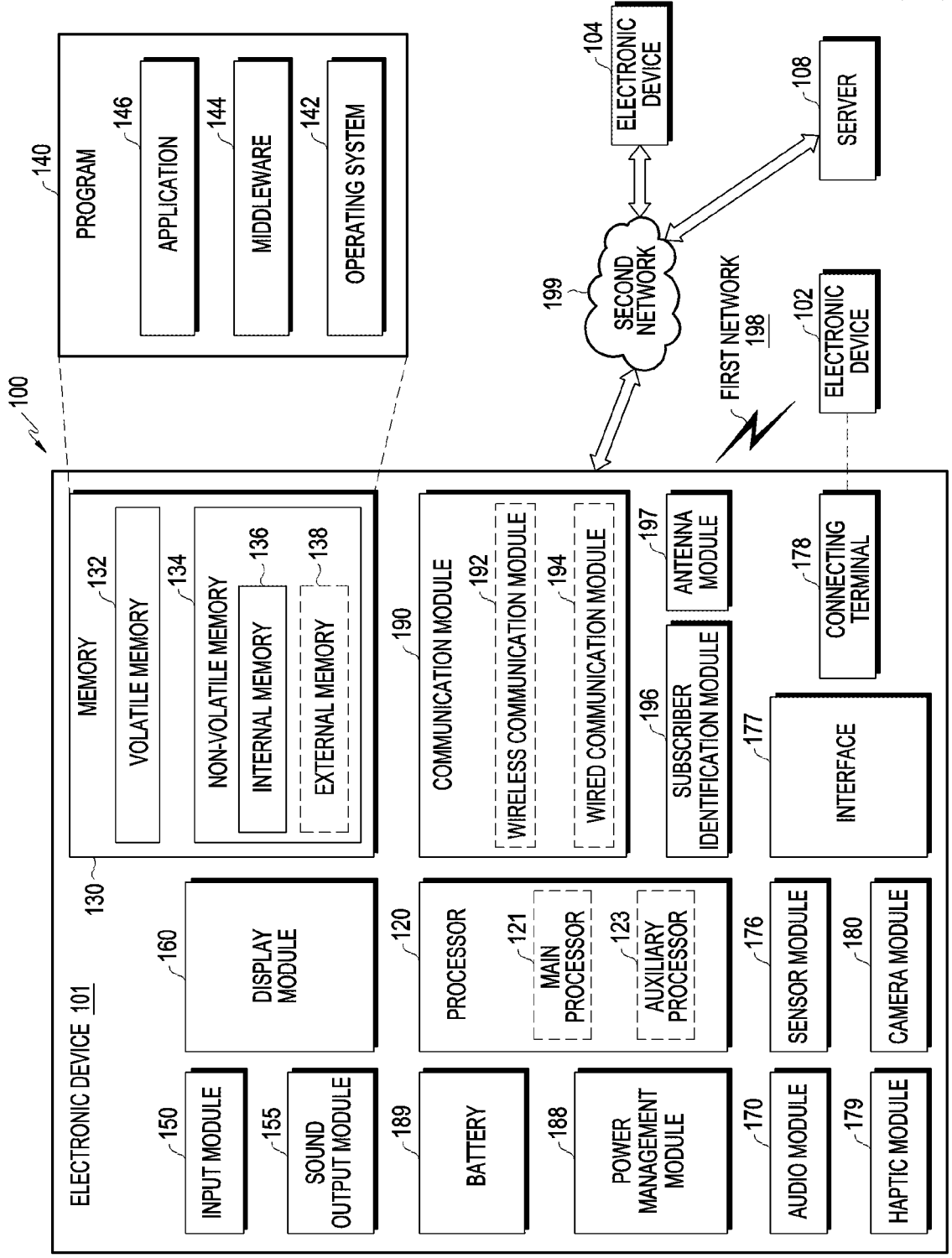
FIG. 1 is a block diagram of an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium which refers, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
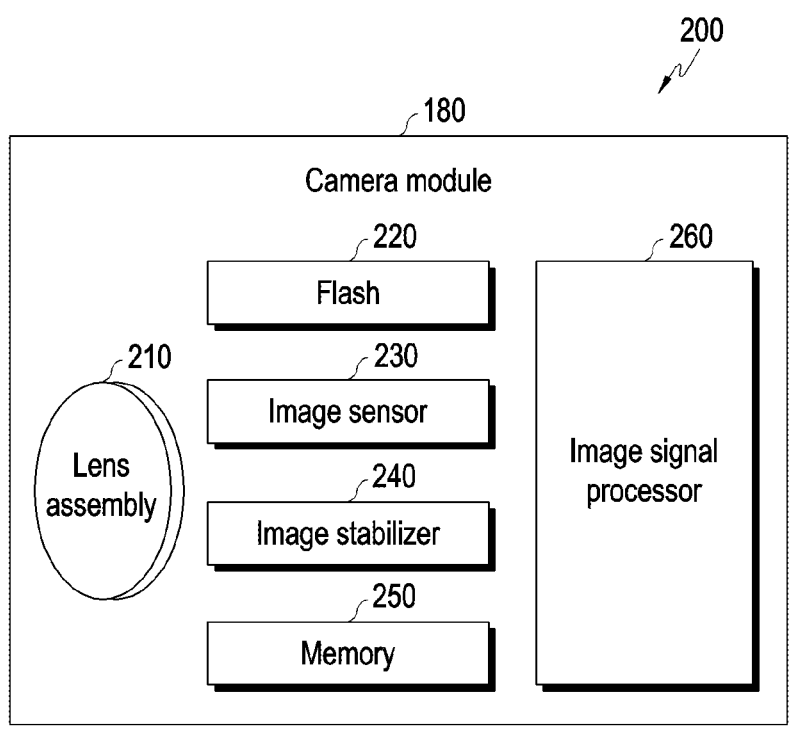
FIG. 2 is a block diagram illustrating an example camera module, according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
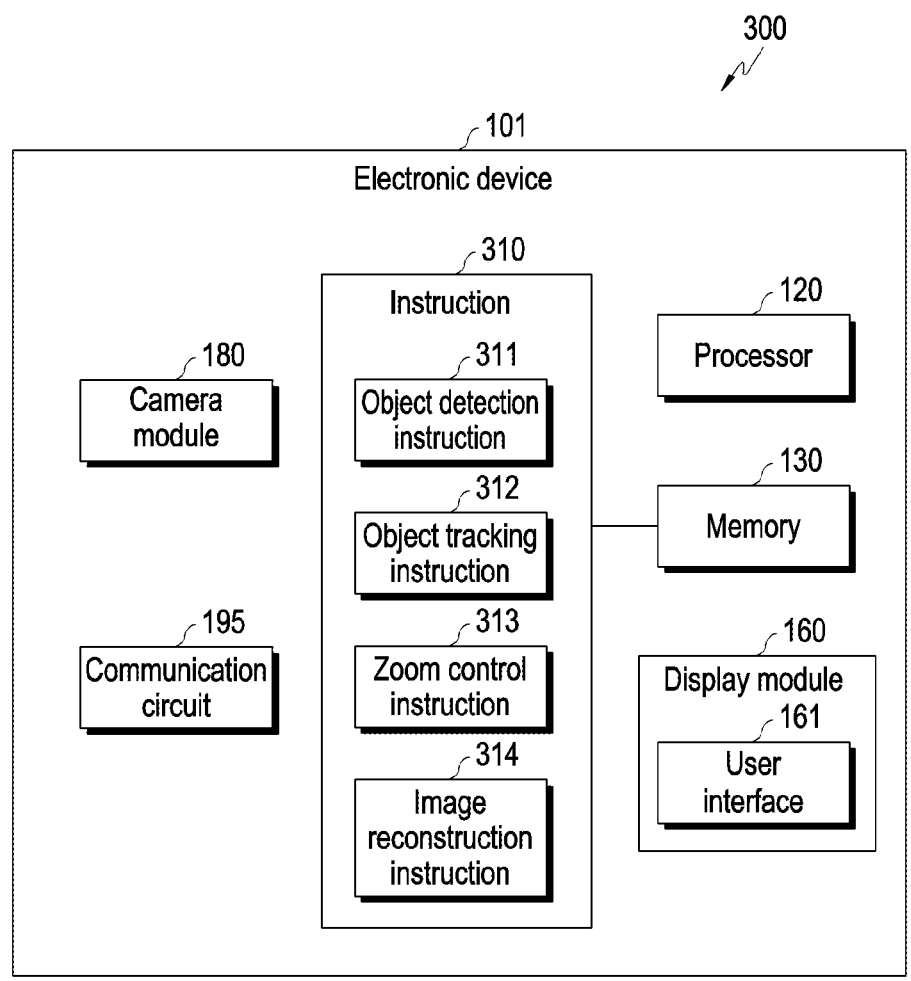
FIG. 3 is a block diagram illustrating an example electronic device according to various embodiments.

FIG. 3 is a block diagram 300 illustrating an example electronic device 101 according to various embodiments.

The electronic device 101 may include a processor 120, a memory 130, a display module 160, a communication circuit 195, and/or a camera module 180.

In an embodiment, the processor 120 may control operations of the memory 130, the display module 160, the communication circuit 195, and/or the camera module 180. The processor 120 may execute the instructions 310 stored in the memory 130. The processor 120 may control the communication circuit 195 such that the communication circuit 195 transmits and receives an RF signal.

In an embodiment, the memory 130 may store the instructions 310. The instructions 310 may configure the operation of the display module 160 and the camera module 180. The instructions 310 may include an object detection instruction(s) 311, an object tracking instruction(s) 312, a zoom control instruction(s) 313, and an image reconstruction instruction(s) 314. Although the instructions 310 are mainly described herein as being executed by the processor 120, at least one of the instructions 310 may be executed by a processor (e.g., the image signal processor 260 in FIG. 2) included in the camera module 180.

In an embodiment, the display module 160 (e.g., including a display and associated circuitry) may display an image. The display module 160 may include a user interface 161. The user interface 161 may include a touch interface (e.g., a touch sensor) configured to receive a user's touch input. The display module 160 may display a graphic user interface capable of visually providing information to a user or receiving a user input.

In an embodiment, the communication circuit 195 may be substantially the same component as the wireless communication module 192 included in the communication module 190 in FIG. 1.

In an embodiment, the camera module 180 (e.g., the lens assembly 210 in FIG. 2) may capture an image of an external environment. The camera module 180 may capture an image of at least one person. The camera module 180 may acquire a visual image of an external environment. The camera module 180 may acquire light incident from an external environment.

In an embodiment, the camera module 180 (e.g., the image sensor 230 in FIG. 2) may convert the external environment into image data, based on the acquired light. The processor 120 may receive the image data converted by the camera module 180 and display the same on the display module 160.

In an embodiment, the processor 120 may detect an object in the image data, based on the object detection instruction 311. The processor 120 may detect a specific object (e.g., a person) in the image data, based on the object detection instruction 311. The processor 120 may simultaneously detect a plurality of objects in the image data, based on the object detection instruction 311.

In an embodiment, the processor 120 may track an object from the image data, based on the object tracking instruction 312. The processor 120 may track a moving object from the image data, based on the object tracking instruction 312. The processor 120 may track an object from the image data, based on the object tracking instruction 312. The processor 120 may select and track an object with user's high interest from the image data, based on the object tracking instruction 312. The processor 120 may configure an object desired to be tracked as a focused subject. The processor 120 may transmit a control signal of the camera module 180 for tracking an object to the camera module 180. For example, the camera module 180 may change the direction in which the lens assembly 210 faces, based on the control signal.

In an embodiment, the processor 120 may track an object from image data by moving at least a portion of the electronic device 101. For example, the electronic device 101 (e.g., an electronic device implemented in the form of a robot) may further include a driving unit (e.g., a motor) that can move the position of the electronic device 101 or move the direction in which the electronic device 101 (e.g., the camera module 180) faces. When an object is moved or an object in focus is changed, the processor 120 may control the driving unit to track the moved object or the object in focus. As another example, the electronic device 101 may be mounted on an external electronic device (e.g., a gimbal) capable of moving the electronic device 101. When an object is moved or an object in focus is changed, the processor 120 may transmit a control signal for moving the electronic device to the external electronic device in order to track the moved object or the object in focus.

In an embodiment, the processor 120 may zoom-in a visual image of an external environment captured based on the zoom control instruction 313. The processor 120 may enlarge at least a partial region of a visual image of an external environment captured based on the zoom control instruction 313. The processor 120 may configure a region desired to be enlarged in a visual image of an external environment captured based on the zoom control instruction 313 as a zoom region. The processor 120 may configure at least one zoom region, based on the zoom control instruction 313. The processor 120 may control the magnification of the zoom region, based on the zoom control instruction 313. The processor 120 may transmit a control signal related to zoom-in or zoom-out to the camera module 180. The camera module 180 may perform zoom-in or zoom-out by changing a configuration of the lens assembly 210, based on the received control signal. Without being limited thereto, those skilled in the art will readily understand that the camera module 180 may perform zoom-in or zoom-out using the image signal processor 260.

In an embodiment, the processor 120 may configure a zoom region, based on the zoom control instruction 313, such that the zoom region includes an object desired to be enlarged and displayed. The processor 120 may control the lens assembly 210, based on the zoom control instruction 313, such that the lens assembly 210 enlarges an object with user's high interest in the image data. The lens assembly 210 may enlarge an object in image data to capture an image thereof, based on the zoom control instruction 313. The processor 120 may configure an object desired to be enlarged as a focused subject. The lens assembly 210 may enlarge a focused subject under the control of the processor 120.

In an embodiment, in a case in which the electronic device 101 (e.g., an electronic device implemented in the form of a robot) includes a driving unit (e.g., a motor) that can move the position of the electronic device 101 or move the direction in which the electronic device 101 (e.g., the camera module 180) faces, the processor 120 may control the driving unit such that the object is maintained at a designated size in the video (or the object is included in the video). For example, in a case in which an object corresponding to a subject is not included in the range of the angle of view of the camera module 180 when the subject approaches the electronic device 101, the processor 120 may move the position of the electronic device 101 through the driving unit such that the electronic device 101 moves away from the subject to enable the object to be maintained at a designated size in the video.

In an embodiment, in a case in which the electronic device 101 is mounted on an external electronic device (e.g., a gimbal) capable of moving the electronic device 101, the processor 120 may control the external electronic device such that the object is maintained at a designated size in the video (or the object is included in the video). For example, in a case in which an object corresponding to a subject is not included in the range of the angle of view of the camera module 180 when the subject approaches the electronic device 101, the processor 120 may transmit a signal for moving the external electronic device away from the subject through the communication module 190 to enable the object to be maintained at a designated size in the video.

In an embodiment, the processor 120 may reconstruct an image, based on the image reconstruction instruction 314. The processor 120 may display the reconstructed image on the display module 160 or store the same in the memory 130. The processor 120 may display an image having an enlarged zoom region on the display module 160 or store the same in the memory 130, based on the image reconstruction instruction 314. Alternatively, the processor 120 may display an image having a cropped zoom region on the display device 160 or store the same in the memory 130, based on the image reconstruction instruction 314. The processor 120 may display an image having a rearranged zoom region on the display module 160, based on the image reconstruction instruction 314. The processor 120 may display an image having an emphasized zoom region on the display module 160, based on the image reconstruction instruction 314. The processor 120 may display, on the display module 160, an image moving according to an object moving in a zoom region, based on the image reconstruction instruction 314.

An electronic device according to various embodiments of the disclosure may include a camera module 180, a processor 120 functionally connected to the camera module 180, and a memory functionally connected to the processor 120, wherein the memory 130 may store instructions which, when executed, cause the processor 120 to obtain a first video, identify a first object in the first video, obtain a parameter related to a zoom region, based on movement of the first object in the first video, identify the first object corresponding to a second object included in a second video obtained through the camera module 180, and obtain a video of the second object from the second video, based on the parameter related to the zoom region.

In various embodiments, the instructions may cause the processor 120 to determine a zoom region related to the second object from the second video, based on the parameter related to the zoom region.

In various embodiments, the parameter related to the zoom region may include at least one of a threshold value related to movement of the zoom region, an average movement speed of the zoom region, or a padding region of the zoom region.

In various embodiments, the instructions may cause the processor 120 to determine the size of the zoom region, based on the padding region, and when the second object moves by the threshold value or more, move the zoom region, based on the average movement speed.

In various embodiments, the instructions may cause the processor 120 to identify an object at a position corresponding to the position of the second object as the first object in the first video.

In various embodiments, the instructions may cause the processor 120 to identify a first time corresponding to the second object in the second video, and identify the first object corresponding to a second time of the first video, based on the identified first time.

In various embodiments, the electronic device 101 may further include a microphone (e.g., the input module 150), and the instructions may cause the processor 120 to acquire an audio signal through the microphone, identify the second time corresponding to the first time, based on the audio signal and an audio signal included in the first video, and identity an object included in the first video at the second time as the first object.

In various embodiments, the instructions may cause the processor 120 to recognize at least one of a time, a beat, a rhythm, or a tempo of the acquired audio signal, and identify the second time corresponding to the first time, based on at least one of the recognized time, beat, rhythm, and tempo.

In various embodiments, the processor 120 may be caused to recognize a voice signal included in the acquired audio signal, and identify the second time corresponding to the first time, based on the recognized voice signal.

In various embodiments, the instructions may cause the processor 120 to identify whether the first video includes a plurality of objects, and when the first video includes the plurality of objects, identify, among the plurality of objects, the first object corresponding to the second object.

In various embodiments, the instructions may cause the processor 120 to identify a second time point of the first video corresponding to a first time point of the second video, determine the position and size of the first object included in the first video at a third time point following the second time point of the first video, determine the position and size of the zoom region, based on the determined position and size of the first object and a parameter related to the zoom region, and obtain a video of the second object from the second video, based on the determined position and size of the zoom region.

In various embodiments, the instructions may cause the processor 120 to determine the sizes of the first objects included in a plurality of images of the first video, respectively, acquired during a time from a time point before a first time with reference to the second time point of the first video to a time point after a second time with reference to the second time point, and determine the position and size of the zoom region, based on the sizes of the first objects and a parameter related to the zoom region.

In various embodiments, the instructions may cause the processor 120 to identify the second time point corresponding to first time point, based on the position of the second object and the position of the first object, or at least one of an audio signal acquired through a microphone of the electronic device 101 and an audio signal included in the first video.

In various embodiments, the instructions may cause the processor 120 to adjust the configuration of the camera module 180, based on the parameter related to the zoom region, and control the camera module, based on the adjusted configuration of the camera module 180, to acquire a video of the second object.

Figure 4:
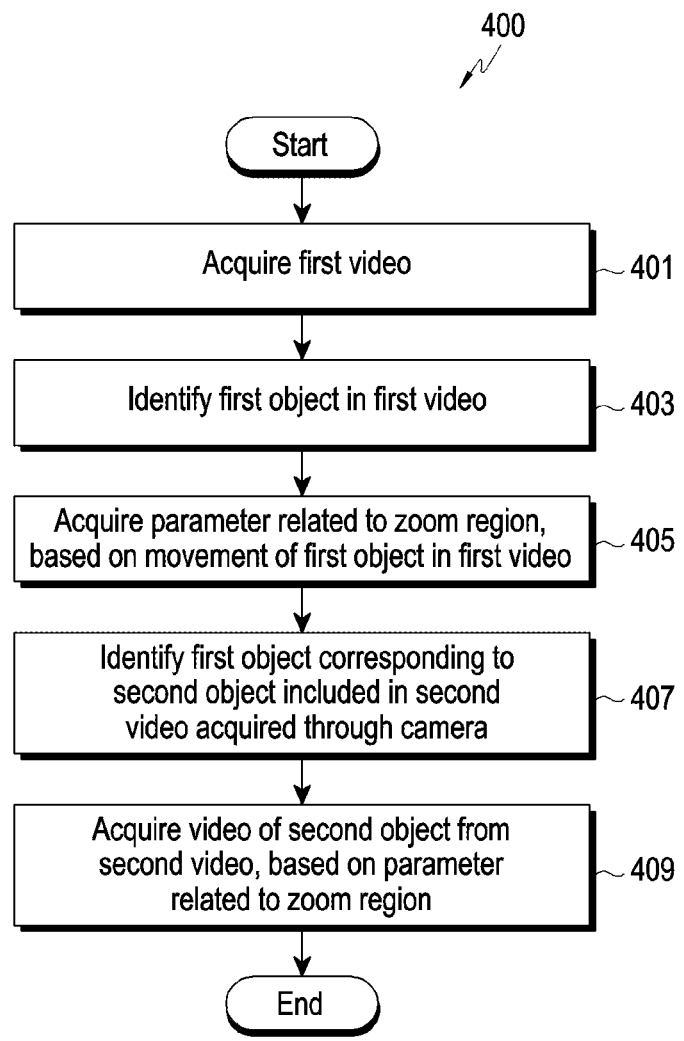
FIG. 4 is an overall flowchart illustrating an example method for providing a video according to various embodiments.

FIG. 4 is an overall flowchart 400 illustrating an example method for providing a video, according to various embodiments.

Referring to FIG. 4, in an embodiment, in operation 401, the processor 120 may acquire a first video (hereinafter, referred to as a "first video"). In an embodiment, the first video may also be referred to as a "reference video".

In an embodiment, the first video may be a video stored in the memory 130 before acquiring (e.g., capturing) a video (e.g., a second video to be described later) through the camera module 180. The processor 120 may acquire the first video from the memory 130.

In an embodiment, the first video may be a video acquired in real time through the communication module 190 using a streaming service. The processor 120 may acquire the first video from the outside (e.g., a server providing a streaming service) through the communication module 190.

However, a method for acquiring a first video is not limited to the above-described examples.

In an embodiment, in a case in which a plurality of videos are stored in the memory 130, the processor 120 may select, automatically (e.g., in a designated manner) or based on a user input, a first video from among the plurality of videos to acquire the first video. Various embodiments of a method for acquiring a first video by selecting the first video from among a plurality of videos will be described later in detail with reference to FIG. 15.

According to an embodiment, in operation 403, the processor 120 may identify (e.g., detect) a first object (hereinafter, referred to as a "first object") in the first video.

In an embodiment, the processor 120 may identify, in a plurality of images (e.g., a plurality of image frames) of a first video, at least one first object corresponding to at least one subject (e.g., a person). For example, the processor 120 may detect at least one object from the plurality of images of the first video using a designated algorithm (e.g., a person detection algorithm or a face detection algorithm).

Various embodiments of an operation for identifying a first object in a first video will be described in detail below with reference to FIG. 5.

Figure 5:
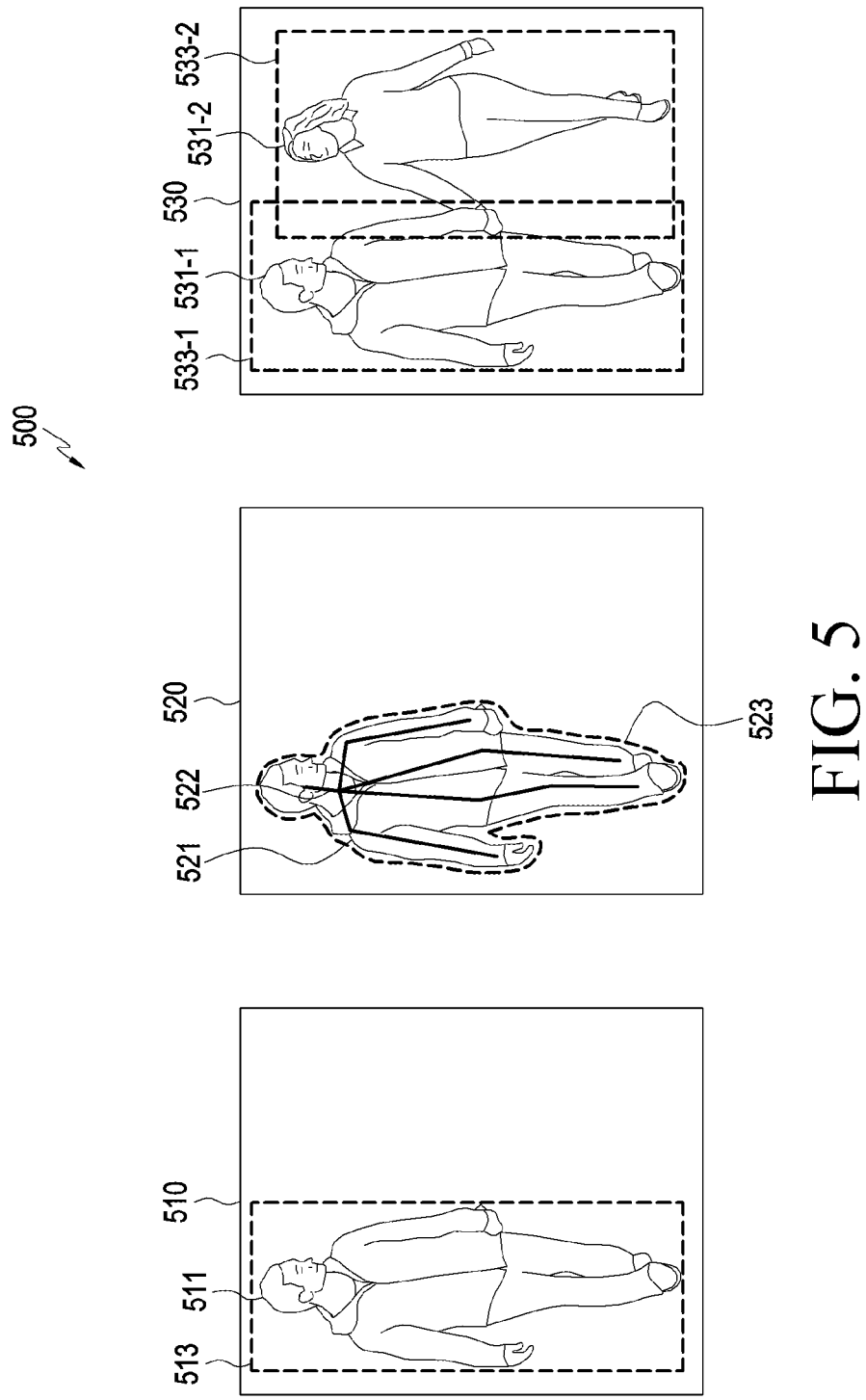
FIG. 5 is a diagram for explaining an example method for identifying a first object in a first video, according to various embodiments.

FIG. 5 is a diagram 500 for explaining an example method for identifying a first object in a first video, according to various embodiments.

Referring to FIG. 5, in an embodiment, the processor 120 may identify (e.g., detect) a first object 511 from an image 510 of a first video. In a case in which the first object 511 is identified from the image 510 of the first video, the processor 120 may determine (e.g., configure) a tracking region 513 for the first object 511. The tracking region 513 may be in the form of a bounding box surrounding the first object within the image 510 of the first video. However, the form of the tracking region 513 is not limited thereto.

In an embodiment, the processor 120 may identify a first object 521 from an image 520 of the first video. The processor 120 may obtain (extract) feature points (e.g., key points) related to skeleton of the first object 521 (e.g., an object corresponding to a person) within the image 520 of the first video. The processor 120 may determine the skeletons 522 of the first object 521 by connecting the feature points, based on the feature points related to the skeletons 522. The processor 120 may determine a tracking region 523 surrounding the skeletons 522 of the first object 521, based on the skeletons of the first object 521.

In an embodiment, the processor 120 may identify a plurality of first objects 531-1 and 531-2 from an image 530 of the first video. In a case in which the plurality of first objects 531-1 and 531-2 are identified from the image 530 of the first video, the processor 120 may determine tracking regions for the plurality of first objects 531-1 and 531-2. For example, the processor 120 may determine the respective tracking regions 533-1 and 533-2 for the plurality of first objects 531-1 and 531-2. As another example, the processor 120 may determine a tracking region (not shown) for a region (e.g., union of regions including the plurality of first objects 531-1 and 531-2, respectively). In an embodiment, the position and size of the first object may correspond, for example, to the position and size of the tracking region for the first object. Hereinafter, it may be understood that the description of the position and size of the first object includes, for example, the description of the position and size of the tracking region of the first object.

Referring back to FIG. 4, in operation 405, in an embodiment, the processor 120 may obtain (acquire) a parameter (hereinafter, interchangeably used with a "default parameter" or a "zoom region-related default parameter"), based on movement of the first object in the first video. The default parameter may include a parameter to be applied (or configured) to the second video. For example, the default parameter may include at least one of a threshold value (a first threshold value) associated with movement of the zoom region, a movement speed of the zoom region of the second video, and/or a padding region (e.g., the size of a padding region) of the zoom region to be applied to the second video.

In an embodiment, the processor 120 may obtain information on the movement of the first object from the first video. In an embodiment, the information on the movement of the first object may include at least one of a region in which the first object has moved within the first video, an average movement speed (and/or maximum movement speed and minimum movement speed) of the first object, or the amount of change in the position and size of the first object.

According to an embodiment, the region in which the first object has moved within the first video may include regions of a plurality of images of the first video in which the first object has been positioned (e.g., moved). For example, the region in which the first object has moved within the first video may be a union of regions of the plurality of images of the first video in which the first object has been positioned.

In an embodiment, the average movement speed of the first object may be a value obtained by dividing a value (e.g., a movement distance of the first object) obtained by summing the amounts of changes in the position of the first object in the plurality of images of the first video by a time during which a plurality of images of the first video are acquired. In an embodiment, the maximum movement speed of the first object may be the maximum amount of change in the position of the first object per unit time (e.g., a time interval at which each of the plurality of images is acquired) in the plurality of images of the first video. In an embodiment, the minimum movement speed of the first object may be the minimum amount of change in the position of the first object per unit time in the plurality of images of the first video.

In an embodiment, the amount of change in the position and size of the first object (e.g., the average amount of change in the position and size of the first object) may include the number of movements of the first object (e.g., the number of movements detected during a designated time). For example, as the number of changes in the position of a subject (e.g., changes in the upper/lower/left/right positions of a subject in a plurality of images) increases during a designated time, the amount of change in the position of a first object corresponding to the subject may increase. As another example, as the number of movements approaching or moving away from the electronic device 101 (e.g., the camera module 180) of the subject increases, the amount of change in which the size of the first object is increased or decreased may increase. In an embodiment, the amount of change in the position and size of the first object may be referred to as variance of movement of the first object.

In an embodiment, in a case in which a plurality of first objects are included in the first video, the processor 120 may obtain information on movement of each of the plurality of first objects.

In an embodiment, in a case in which a plurality of first objects are included in the first video, the processor 120 may obtain information on movements of all of the plurality of first objects. For example, in a case in which a plurality of first objects are included in the first video as in the image 530 in FIG. 5, the processor 120 may determine a tracking region for a region including all of the plurality of first objects (e.g., a union of regions including the plurality of first objects). The processor 120 may acquire information on movements of all of the plurality of first objects by acquiring information on change in the determined tracking region.

In an embodiment, in a case in which a plurality of first objects are included in the first video, the processor 120 may acquire information on movement of each of the plurality of first objects, and information on movements of all of the plurality of first objects.

In an embodiment, the processor 120 may obtain a parameter related to a zoom region, based on the obtained information on the movement of the first object. For example, the processor 120 may obtain a parameter related to a zoom region to be applied to a video (hereinafter referred to as a "second video") to be acquired through the camera module 180, based on the acquired information on the movement of the first object.

In an embodiment, the processor 120 may obtain a threshold value (hereinafter, referred to as a "first threshold value") related to movement of a zoom region to be applied to a second video, based on the region in which the first object has moved within the first video. For example, the processor 120 may determine (e.g., configure) the first threshold value to be lower as the region in which the first object has moved within the first video is larger (e.g., wider). The processor 120 may determine (e.g., configure) the first threshold value to be higher as the region in which the first object has moved within the first video is smaller (e.g., narrower).

In an embodiment, the first threshold value may be a value for determining whether to move the position of the zoom region of the first video in a second video following the first video (e.g., subsequent to the first video). For example, in a case in which the position difference between the position of the object included in the first video and the position of the object included in the second video following the first video is less than or equal to the first threshold value, the processor 120 may cause the position of the zoom region of the first video to be maintained (unchanged) in the second video (e.g., such that the zoom region is not moved).

In an embodiment, the processor 120 may track an object to be identified within the second video quickly (or sensitively) by determining the first threshold value to be lower as the region in which the first object has moved within the first video is larger. For example, in a case in which a movement of an object to be identified is present in the second video, the processor 120 may quickly move the zoom region according to the movement of the object by determining the first threshold value to be lower.

In an embodiment, the processor 120 may cause the zoom region of the object to be unchanged with respect to a small movement of the object to be identified within the second video by determining the second threshold value to be higher as the region in which the first object has moved within the first video is smaller. The processor 120 may obtain a stable video by causing the zoom region of the object to be unchanged with respect to a small movement of the object to be identified within the second video.

In an embodiment, the processor 120 may determine the movement speed of the zoom region of the second video, based on the average movement speed of the first object. For example, the processor 120 may configure the movement speed of the zoom region of the second video to be higher (e.g., faster) as the average movement speed of the first object is higher (e.g., faster), and determine the movement speed of the zoom region of the first video to be lower (e.g., slower) as the average movement speed of the first object is lower (e.g., slower).

In an embodiment, the processor 120 may stably or accurately track the object to be identified in the second video by determining the movement speed of the zoom region of the second video, based on the average movement speed of the first object. For example, the processor 120 may cause the zoom region of the object to be identified in the second video to move smoothly or accurately by determining the movement speed of the zoom region of the second video, based on the average movement speed of the first object.

In an embodiment, the processor 120 may determine a padding region (e.g., the size of a padding region) of a zoom region to be applied to the second video, based on the amount of change in the position and size of the first object.

Figure 6:
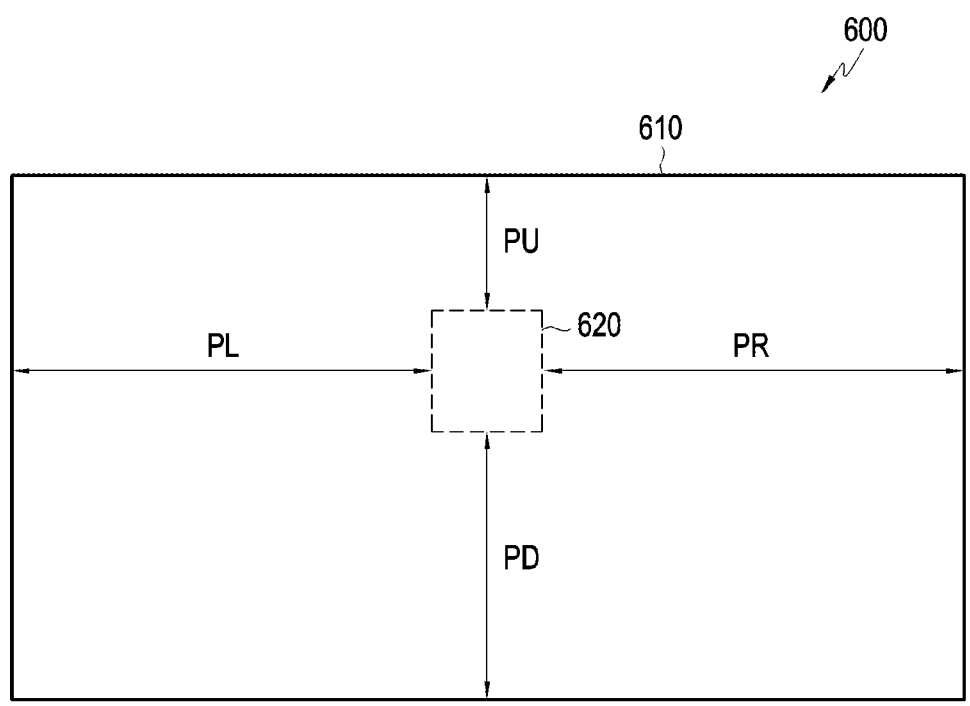
FIG. 6 is a diagram for explaining an example padding region of a zoom region to be applied to a second video, according to various embodiments.

FIG. 6 is a diagram 600 for explaining a padding region of a zoom region to be applied to a second video, according to various embodiments.

Referring to FIG. 6, the size of the zoom region 610 may be determined by the size of the tracking region 620 (or the size of the object) and the left distance (or left padding (PL)), the upper distance (or upper padding (PU)), the right distance (or right padding (PR)), and the lower distance (or a lower padding (PD)) from the tracking region 620. In an embodiment, the processor 120 may determine the padding region of the zoom region to be applied to the second video to be wider as the amount of change in the position and size of the first object of the first video increases. For example, the processor 120 may determine the left padding (PL), upper padding (PU), right padding (PR), and lower padding (PD) of the zoom region to be applied to the second video to be longer as the average amount of change in the position of the first object and/or the size of the first object of the first video increases. The processor 120 may determine the padding region of the zoom region to be applied to the second video to be narrower as the amount of change in the size of the first object and/or the position of the first object of the first video decreases. In an embodiment, in a case in which a large number of movements of an object to be identified in the second video is present within a designated time period, the processor may cause the size of the zoom region to be applied to the second video to be unchanged by determining the padding region of the zoom region to be applied to the second video to be wider as the amount of change in the position and size of the first object of the first video increases. The processor 120 may minimize shaking of a video to be acquired through the zoom region to be applied to the second video by causing the size of the zoom region to be applied to the second video to be unchanged. In an embodiment, in a case in which a small number of movements of an object to be identified in the second video is present within a designated time period, the processor may acquire a video including an object of a larger size (e.g., enlarged by a larger magnification) through the zoom region to be applied to the second video by determining the padding region of the zoom region to be applied to the second video to be narrower as the amount of change in the position and size of the first object of the first video decreases.

In an embodiment, in a case in which a plurality of first objects are included in a first video, the processor 120 may obtain a parameter related to a zoom region of each of the plurality of first objects, based on information on movement of each of the plurality of first objects.

In an embodiment, in a case in which a plurality of first objects are included in a first video, the processor 120 may obtain parameters related to zoom regions of all of the plurality of first objects, based on information on movements of all of the plurality of first objects.

In an embodiment, in a case in which a plurality of first objects are included in a first video, the processor 120 may obtain a parameter related to a zoom region of each of the plurality of first objects, and a parameter related to a zoom region including all of the plurality of first objects, based on information on the movement of each of the plurality of first objects and the information on the movements of all of the plurality of first objects.

In an embodiment, in operation 407, the processor 120 may identify a first object corresponding to a second object (hereinafter, referred to as a "second object") included in a second video acquired through the camera module 180.

In an embodiment, the processor 120 may detect the second object from the second video acquired through the camera module 180. For example, the processor 120 may detect at least one second object from the plurality of images of the second video using a designated algorithm (e.g., a person detection algorithm or a face detection algorithm).

In an embodiment, the processor 120 may identify, within the first video, the first object corresponding to the second object of the second video.

In an embodiment, the processor 120 may identify the first object corresponding to the second object by comparing the feature (e.g., feature points) of the second object with the feature of the first object in the first video. For example, in a case in which the similarity rate (or matching degree) between the feature of the second object and the feature of the first object in the first video is greater than or equal to a specified similarity rate, the processor 120 may identify the first object as corresponding to the second object. As another example, in a case in which the first video includes a plurality of first objects, the processor 120 may identify the first object corresponding to the second object from among the plurality of first objects by comparing the second object and the plurality of first objects. As another example, in a case in which the second video includes a plurality of second objects and the first video includes a plurality of first objects, the processor 120 may identify at least one first object, from among the plurality of first objects, corresponding to at least one second object selected based on a user input from among the plurality of second objects.

In an embodiment, the processor 120 may identify the first object corresponding to the second object by comparing the position of the second object with the position of the first object. For example, the processor 120 may compare the position (e.g., coordinate) of the second object at a first time point (e.g., a time point after a first time with reference to a start time point (e.g., the capturing time point) of the second video) of the second video with the position of the first object at a time point (e.g., a time point after the first time with reference to a start time point of the first video) of the first video corresponding to the first time point of the second video. In a case in which the difference between the position of the second object at the first time point of the second video and the position of the first object at the time point corresponding to the first time point is less than a designated difference, the processor 120 may identify the first object as corresponding to the second object.

In an embodiment, the processor 120 may identify the first object corresponding to the second object by comparing the amount of change in the position of the second object with the amount of change in the position of the first object. For example, the processor 120 may identify a change (e.g., displacement) of the position of the second object within a predetermined number of images in the second video. The processor 120 may identify an object, the position of which has been changed by the change in the position of the second object within images of the first video as a first object corresponding to the second object.

In an embodiment, in a case in which the first video includes a plurality of first objects, the processor 120 may identify the first object corresponding to the second object from among the plurality of first objects by comparing the position (or amount of change in position) of the second object with the positions (or amounts of changes in positions) of the plurality of first objects.

In an embodiment, the processor 120 may identify the first object corresponding to the second object, based on the time points (or times) corresponding to the first video and the second video.

For example, the processor 120 may identify the second object at a first time point (e.g., a time point after a first time with reference to a start time point of the second video) of the second video. The processor 120 may identify a time point of the first video corresponding to the first time point of the second video (e.g., a time point after the first time from the start time of the first video). The processor 120 may identify an object included in an image at the time point of the first video corresponding to the first time point of the second video as the first object corresponding to the second object.

As another example, the processor 120 may identify, in the second video, a second object (e.g., a second object corresponding to a subject outside the range of the angle of view of the camera module 180 after being within the range of the angle of view of the camera module 180 for a first time) included in the second video for the first time. The processor 120 may identify, in the first video, an object included in the first video for the first time, as the first object corresponding to the second object.

In an embodiment, the processor 120 may identify the first object corresponding to the second object, based on an audio signal.

In an embodiment, the processor 120 may acquire an audio signal (e.g., an audio signal related to music) (hereinafter, referred to as an "acquired audio signal") through a microphone (e.g., the input module 150) while acquiring the second video through the camera module 180. The processor 120 may identify a waveform of the acquired audio signal and/or energy of the audio signal.

In an embodiment, the processor 120 may identify a correlation between the acquired audio signal and the audio signal of the first video, based on the waveform of the acquired audio signal and the waveform of the audio signal of the first video. The processor 120 may identify the acquired audio signal and the audio signal of the first video as corresponding audio signals (e.g., audio signals for the same music), based on the correlation between the acquired audio signal and the audio signal of the first video. The processor 120 may identify a second time point (e.g., a second time point with reference to a time point of the first video) of the first video corresponding to a first time point (e.g., a first time point with reference to a time point of the second video) of the second video, based on the time difference (e.g., delay time or phase difference) between the waveform of the acquired audio signal and the waveform of the audio signal of the first video.

In an embodiment, the processor 120 may identify the energy of the acquired audio signal and the energy of the audio signal of the first video are corresponding audio signals (e.g., audio signals for the same music), based on the energy of the acquired audio signal and the energy of the audio signal of the first video. The processor 120 may identify a second time point (e.g., a second time point with reference to a time point of the first video corresponding to a first time point (e.g., a first time point with reference to a time point of the second video) of the second video, based on the time difference (e.g., delay time) between the energy of the acquired audio signal and the energy of the audio signal of the first video.

In an embodiment, the processor 120 may identify a first object corresponding to a second object, based on at least one among a time, a beat, a rhythm, or a tempo of the acquired audio signal. For example, the processor 120 may recognize, at a first time point of the second video, at least one of a time, a beat, a rhythm, or a tempo of the acquired audio signal. The processor 120 may identify, in the first video, a time point at which at least one of a time, a beat, a rhythm, or a tempo corresponding to at least one among a time, a beat, a rhythm, or a tempo of the acquired audio signal is recognized, as a time point corresponding to (or in sync with) the first time point of the second video.

In an embodiment, the processor 120 may identify a first object corresponding to a second object, based on the voice signal included in the acquired audio signal. For example, the processor 120 may recognize, at a first time point of the second video, a voice signal (e.g., a user's voice signal) included in the acquired audio signal, for example, using the voice recognition module. The processor 120 may identify, in the first video, a time point at which a voice signal corresponding to a voice signal included in the acquired audio signal is recognized, as a time point corresponding to the first time point of the second video.

In an embodiment, the processor 120 may identify a first object corresponding to a second object, based on noise (e.g., ambient noise or white noise) included in the acquired audio signal. For example, the processor 120 may recognize, at the first time point of the second video, the noise included in the acquired audio signal. The processor 120 may identify, in the first video, a time point at which a voice signal corresponding to noise included in the acquired audio signal is recognized, as a time point corresponding to the first time point of the second video.

In an embodiment, the processor 120 may identify, at the first time point of the second video and at the second time point corresponding thereto, a first object corresponding to a second object by comparing the feature (e.g., feature points) of the second object in the second video with the feature of the first object in the first video.

In an embodiment, the processor 120 may identify, at the first time point of the second video and at the second time point corresponding to the first time point, a first object corresponding to a second object by comparing the position (or amount of change in position) of the second object with the position (or amount of change in position) of the first object.

In an embodiment, the processor 120 may identify, at the first time point of the second video and at the second time point corresponding to the first time point, a first object corresponding to a second object by comparing the feature and position (or the amount of change in position) of the second object with the feature and position (or the amount of change in position) of the first object.

The above discussion of operation 407 identify various manners in which a first object corresponding to the second object included in the second video is identified, but the disclosure is not limited in this respect. For example, the processor 120 may identify, in the second video, the second object corresponding to the first object included in the first video. As another example, in a case in which a plurality of first objects are identified in the first video, the processor 120 may identify the second object corresponding to each of the plurality of first objects in the second video.

In an embodiment, in operation 409, the processor 120 may acquire a video of the second object from the second video, based on a parameter (e.g., a default parameter related to a zoom region) related to the zoom region. For example, the processor 120 may acquire a video of the second object by cropping a plurality of images included in the second video, based on the default parameter.

In an embodiment, the processor 120 may apply a default parameter related to a zoom region of the first object in the first video corresponding to the second object with respect to the second object in the second video (or the plurality of images including the second object). For example, in a case in which the second object is a (2-1)th object (e.g. (2-1)th object is an object detected in the second video), the processor 120 may apply a default parameter related to the zoom region of a (1-1)th object in the first video corresponding to the (2-1)th object. For another example, in a case in which the second object is a (2-2)th object (e.g. (2-2)th object is an object detected in the second video, the (2-2)th object being different from the (1-2)th object), the processor 120 may apply a default parameter related to the zoom region of a (1-2)th object in the first video corresponding to the (2-2)th object. As another example, in a case in which the second object is a plurality of second objects, the processor 120 may apply a default parameter related to the zoom region of a plurality of first objects in the first video corresponding to the plurality of second objects.

In an embodiment, the processor 120 may apply a default parameter related to the zoom region of the first object in the first video corresponding to the second object with respect to the second object, for each time section of the second video, based on the second object included in the second video in the time section. For example, in a case in which the (2-1)th object is included in the images in the first time section of the second video, the processor 120 may apply a default parameter related to the zoom region of the (1-1)th object in the first video corresponding to the (2-1)th object. In another example, in a case in which the (2-2)th object is included in the images at the second time section of the second video, the processor 120 may apply a default parameter related to the zoom region of the (1-2)th object in the first video corresponding to the (2-2)th object.

In an embodiment, the processor 120 may apply a default parameter related to the zoom region with respect to the second video (e.g., each of a plurality of images included in the second video) while acquiring the second video.

In an embodiment, the processor 120 may determine, as a default parameter related to the zoom region, a threshold value (a first threshold value) related to the movement of the zoom region to be applied to the second video, movement speed of the zoom region of the second video, and/or a padding region (e.g., the size of the padding region) of the zoom region to be applied to the second video.

In an embodiment, while the second video is acquired, the processor 120 may acquire a video by moving, at a movement speed (e.g., an average movement speed) of the zoom region when the second object moves by a first threshold value or more, the zoom region having the size determined based on the padding region.

Various embodiments of an example method for applying a default parameter related to a zoom region with respect to a second video will be described in detail below with reference to FIGS. 7 and 8.

Figure 7:
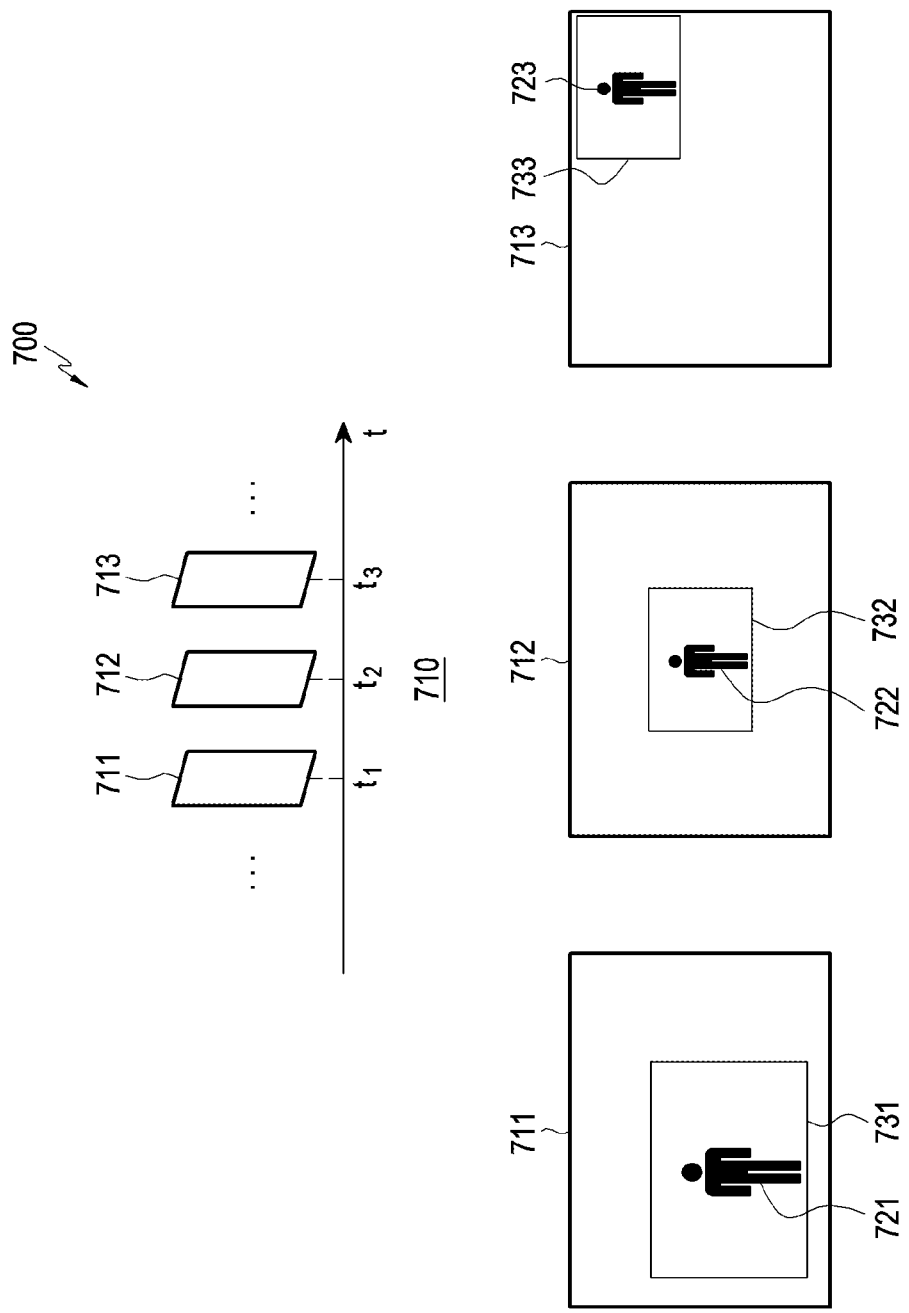
FIG. 7 is a diagram for explaining an example method for applying a default parameter related to a zoom region with respect to a second video, according to various embodiments.

FIG. 7 is a diagram 700 for explaining an example method for applying a default parameter related to a zoom region with respect to a second video, according to various embodiments.

Referring to FIG. 7, reference numeral 710 may indicate a plurality of images 711, 712, and 713 in a second video acquired through the camera module 180 over time.

In an embodiment, the processor 120 may apply (e.g., configure) a default parameter to the second object 721 detected from the first image 711 at a first time point (t1). For example, the processor 120 may apply a padding region of the zoom region of the default parameter with respect to the second object 721 (or a tracking region of the second object 721) detected from the first image 711 at the first time point (t1), thereby determining (e.g., configuring) a first zoom region 731.

In an embodiment, the processor 120 may apply (e.g., configure) a default parameter with respect to the second object 722 detected from the second image 712 at the second time point (t2). For example, the processor 120 may apply the movement speed of the zoom region of the default parameter with respect to the first zoom region 731 of the first image 711 at the first time point (t1). The processor 120 may apply the padding region of the zoom region of the default parameter to the detected second object 722 (or the tracking region of the second object 722), thereby determining (e.g., configuring) the second zoom region 732. In an embodiment, in a case in which the difference between the position of the first object 721 in the first image 711 at the first time point (t1) and the position of the second object 722 in the second image 712 at the second time point (t2) is the first threshold value or less, the processor 120 may not move the position of the first zoom region 731 to the position of the second zoom region 732 with respect to the second image 712 at the second time point (t2) (e.g., the position of the zoom region 731 at the first time point (t1) is maintained at the second time point (t2)).

In an embodiment, the processor 120 may apply (e.g., configure) a default parameter with respect to the second object 723 detected from the third image 713 at a third time point (t3), thereby determining the third zoom region 733.

In an embodiment, the processor 120 may enlarge (or reduce) the first zoom region 731, the second zoom region 732, and the third zoom region 733, thereby acquiring a part of a video. The processor 120 may repeat the operation of acquiring the first zoom region 731, the second zoom region 732, and the third zoom region 733, based on the method described with reference to FIG. 7, thereby acquiring a video.

In FIG. 7, examples of a method for applying a default parameter, based on the second object 722 detected from the second image 712 of the second video, have been described. However, in an embodiment, the processor 120 may determine (e.g., predict) the position and size of an object to be included in the second image 812 using the first video, and apply a default parameter to the determined position and size of the object. Various embodiments of a method for applying a default parameter, based on the position and size of an object to be included in the second image 812, using the first video will be described later in detail with reference to FIGS. 9 and 10.

Figure 8:
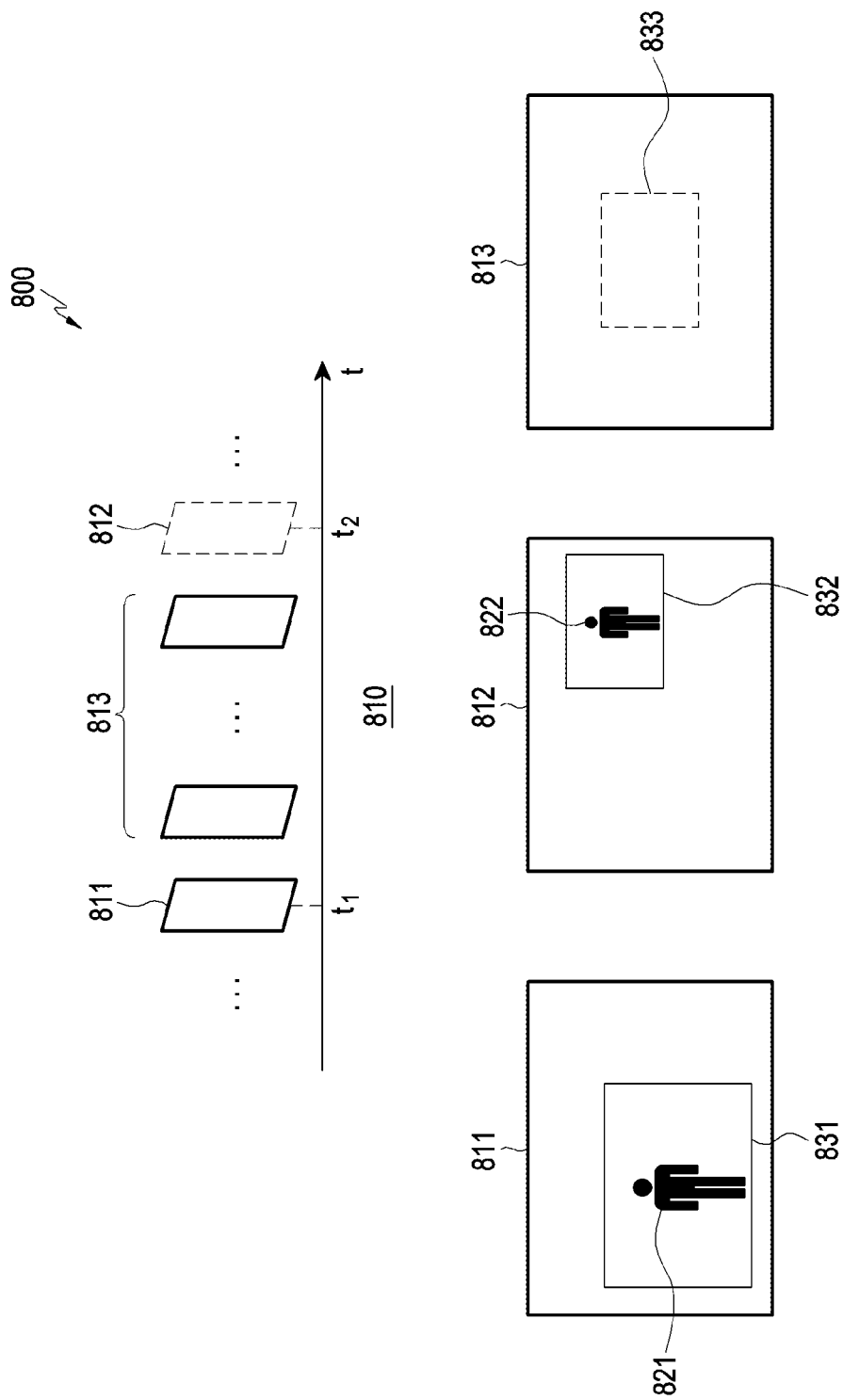
FIG. 8 is a diagram for explaining an example method for applying a default parameter related to a zoom region with respect to a second video, according to various embodiments.

FIG. 8 is a diagram 800 for explaining an example method for applying a default parameter related to a zoom region with respect to a second video, according to various embodiments.

Referring to FIG. 8, reference numeral 810 may indicate a plurality of images 811, 812, and 813 in a second video acquired through the camera module 180 over time.

In an embodiment, the processor 120 may determine (e.g., predict) the position and size of the object 822 in the second image 812 acquired at the second time point (t2) after the plurality of images 813, based on the position and size of the object 821 in the first image 811 acquired at the first time point (t1) and the position and size of the object in at least one image acquired before the first image 811. For example, the processor 120 may determine (e.g., predict) the position and size of the object 822 in the second image 812 after the plurality of images 813 using a designated method (e.g., a Kalman filter), based on the position and size of the object 821 in the first image 811 and the position and size of the object in at least one image acquired before the first image 811.

In an embodiment, the processor 120 may determine (e.g., calculate) the second time point (t2) (or the number of the plurality of images 813 corresponding to the second time point (t2)) in consideration of the speed at which images of the second video are acquired (e.g., frame per second (FPS)) and the time required to determine zoom regions for the plurality of images 813.

In an embodiment, the processor 120 may determine the position and size of the zoom region to be applied to the plurality of images 813 to be acquired between the first image 811 and the second image 812 using a default parameter related to the zoom region of the first object in the first video, based on the position and size of the object 821 in the first image 811 and the position and size of the object 822 in the second image 812.

In an embodiment, the processor 120 may determine the zoom region (e.g., position and size of a zoom region) 832 to be applied to the object 822, based on the position and size of the object 822 in the second image 812. For example, the processor 120 may determine the zoom region 832 by applying a padding region of the zoom region of the default parameter, based on the position and size of the object 822 in the second image 812.

In an embodiment, the processor 120 may determine the zoom regions (hereinafter referred to as "target zoom regions") (e.g., zoom region 833) to be applied to the plurality of images 813 to be acquired between the first image 811 and the second image 812, based on the zoom region 831 of the object 821 in the first image 811 and the zoom region 832 of the object 822 in the second image 812.

In an embodiment, the processor 120 may determine a parameter related to the size and movement speed of the target zoom regions using Equation 1 below.

$$k = \alpha + \beta^* \text{area}(B_1) + \gamma^*(1 - IoU(B_1, B_2)) + \mu^* \text{distance}(B_1, B_2) \quad \text{[Equation 1]}$$

In [Equation 1], k may denote a parameter related to the movement speed of the target zoom regions, $B_1$ may denote the position and size of the zoom region 831 of the first image 811, and $B_2$ may denote the position and size of the zoom region 832 of the second image 812.

Area ($B_1$) may denote the size (e.g., area) of the zoom region 831 of the first image 811. Intersection of union (IoU) ($B_1$, $B_2$) may denote an intersection (a value obtained by dividing an intersection by a union) with respect to the union of $B_1$ and $B_2$. Distance ($B_1$,$B_2$) may denote a distance (e.g., the difference between the position of $B_1$ and the position of $B_2$) between the position of $B_1$ and the position of $B_2$.

α may be a coefficient indicating the movement speed of the zoom region of the default parameter, β may be a coefficient indicating the weight for the zoom region of the (1-1)th time point (e.g., t1 in FIG. 10) of a second video, γ may be a coefficient indicating the weight for IoU ($B_1$, $B_2$), and μ may be a coefficient indicating the weight for distance ($B_1$, $B_2$).

α, β, γ, and μ may be configured such that k is between 0 and 1.

Based on [Equation 1], the movement speed of the target zoom regions may be proportional to the movement speed of the zoom region of the default parameter, the size (e.g., area) of the zoom region 831 of the first image 811, and the distance between the zoom region 831 and the zoom region 832, and may be inversely proportional to IoU ($B_1$,$B_2$) (the overlapping region between the zoom region 831 and the zoom region 832).

In an embodiment, based on [Equation 1], as the distance between the zoom region 831 and the zoom region 832 increases (e.g., as spaced farther), the movement speed of the target zoom regions may increase. Based on [Equation 1], as the distance between the zoom region 831 and the zoom region 832 increases, the speed (e.g., acceleration) at which the movement speed of the target zoom regions increases may decrease. Through this, the zoom region 833 may be moved stably (or smoothly) within the plurality of images 813.

In an embodiment, at least one of the elements in [Equation 1] may not be considered when determining the parameter k related to the movement speed and size of the target zoom regions. For example, the speed at which a plurality of images of the second video are acquired (e.g., frame per second (FPS)) may be faster by a designated speed or more, compared to the movement speed (e.g., the maximum speed) of the second object in the second video. In this case, the parameter k related to the movement speed and size of the target zoom regions may be determined by excluding μ*distance ($B_1$,$B_2$) from among the elements in [Equation 1].

In an embodiment, the processor 120 may determine target zoom regions (e.g., positions and sizes of target zoom regions) using Equation 2 below, based on the parameter k related to the movement speed and size of the target zoom regions.

$$B_n = k*B_2 + (1-k)*(B_1) \quad \text{[Equation 2]}$$

$B_n$ may denote the position and size of each of the target zoom regions (e.g., the zoom region 833 of the image 813), $B_1$ may denote the position and size of the first image 811, $B_2$ may denote the position and size of the second image 812. For example, the result of [Equation 2] may be as shown in [Equation 3] below.

$$B_n = \{B^l, B^t, B^r, B^b\} = \{k*B_2^l + (1-k)*B_1^l, \quad \text{[Equation 3]}$$
$$k*B_2^t + (1-k)*B_1^t, k*B_2^r + (1-k)*B_1^r, k*B_2^b + (1-k)*B_1^b\}$$

$B^l$, $B^t$, $B^r$, $B^b$ may denote the lengths of left, top, right, and bottom side of $B_n$, respectively. $B_2^l$, $B_2^t$, $B_2^r$ and $B_2^b$ may denote the lengths of left, top, right, and bottom side of $B_2$, respectively. $B_1^l$, $B_1^t$, $B_1^r$, and $B_1^b$ may denote the lengths of left, top, right, and bottom side of $B_1$, respectively.

In an embodiment, the processor 120 may apply the position and size of each of the target zoom regions with respect to the plurality of images 813 while the plurality of images 813 are acquired through the camera module 180.

FIG. 8 describes examples of determining (e.g., predicting) the position and size of the object 822 in the second image 812 after the plurality of images 813 using a designated method (e.g., Kalman filter). However, in an embodiment, the processor 120 may determine (e.g., predict) the position and size of the object 822 in the second image 812 using the first video. A method for determining (e.g., predicting) the position and size of the object 822 in the second image 812 using the first video will be described later in detail with reference to FIGS. 11 and 12.

In an embodiment, the processor 120 may enlarge (or reduce) target zoom regions within the plurality of images 813, thereby acquiring a part of a video. Based on the method described with reference to FIG. 8, the processor 120 may repeat an operation of acquiring target zoom regions, thereby acquiring a video.

In an embodiment, the processor 120 may store the acquired video in the memory 130.

In an embodiment, the processor 120 may display the acquired video through a display (e.g., the display module 160). For example, the processor 120 may continuously display enlarged images of target zoom regions in the acquired video through a display (e.g., the display module 160) in real time.

Although not shown in FIG. 4, in an embodiment, the processor 120 may configure a mode corresponding to a parameter related to a zoom region. For example, the processor 120 may store, in the memory 130, parameters related to zoom regions for a plurality of videos (e.g., a first video). In an embodiment, in a case in which the processor 120 stores a parameter related to a zoom region in the memory 130, the processor 120 may store, in the memory 130, an image (e.g., a thumbnail) representing (or to identify) the parameter related to the zoom region together with the parameter.

In an embodiment, the processor 120 may configure a mode for each of parameters related to zoom regions. In a case in which a user of the electronic device 101 selects a desired mode, the processor 120 may apply a parameter related to a zoom region corresponding to the selected mode with respect to a video desired to be recorded. Through this, the user may apply, with respect to a video desired to be recorded, a parameter related to a zoom region of an object corresponding to a recorded subject, the motion of which is similar to the motion (e.g., dancing motion) of a subject desired to be recorded by the user.

In an embodiment, the processor 120 may apply a parameter related to a zoom region with respect to an object corresponding to a subject while displaying a preview through a display (e.g., the display module 160), based on the image acquired through the camera module 180, thereby allowing the user to identify whether a parameter related to a desired zoom region has been obtained. Various embodiments related thereto will be described later in detail with reference to FIG. 16.

Although not shown in FIGS. 4 to 9, in an embodiment, the processor 120 may adjust the configuration of the camera module 180, based on a parameter related to a zoom region (e.g., the camera module 180 (e.g., by controlling the lens assembly 210)), thereby acquiring a video of a second object from the second video. For example, the processor 120 may determine whether to move the lens assembly 210, based on a threshold value related to the movement of the zoom region. The processor 120 may determine the movement speed (e.g., the average speed) at which the lens assembly 210 is moved, based on the average movement speed of the zoom region. The processor 120 may control the lens assembly 210 to perform a zoom-in or zoom-out operation, based on a padding region of the zoom region.

Although not shown in FIGS. 4 to 9, in an embodiment, the processor 120 may move the electronic device, based on a parameter related to a zoom region. For example, in a case in which the electronic device 101 (e.g., an electronic device implemented in the form of a robot) includes a driving unit (e.g., a motor) capable of moving the position of the electronic device 101 or changing the direction in which the electronic device 101 (e.g., the camera module 180) faces, the processor 120 may move the electronic device 101 by controlling the driving unit, based on the parameter related to the zoom region. As another example, in a case in which the electronic device 101 is mounted on an external electronic device (e.g., a gimbal) capable of moving the electronic device 101, the processor 120 may transmit a signal for moving the electronic device 101 to the external electronic device, based on the parameter related to the zoom region through the communication module 190.

Figure 9:
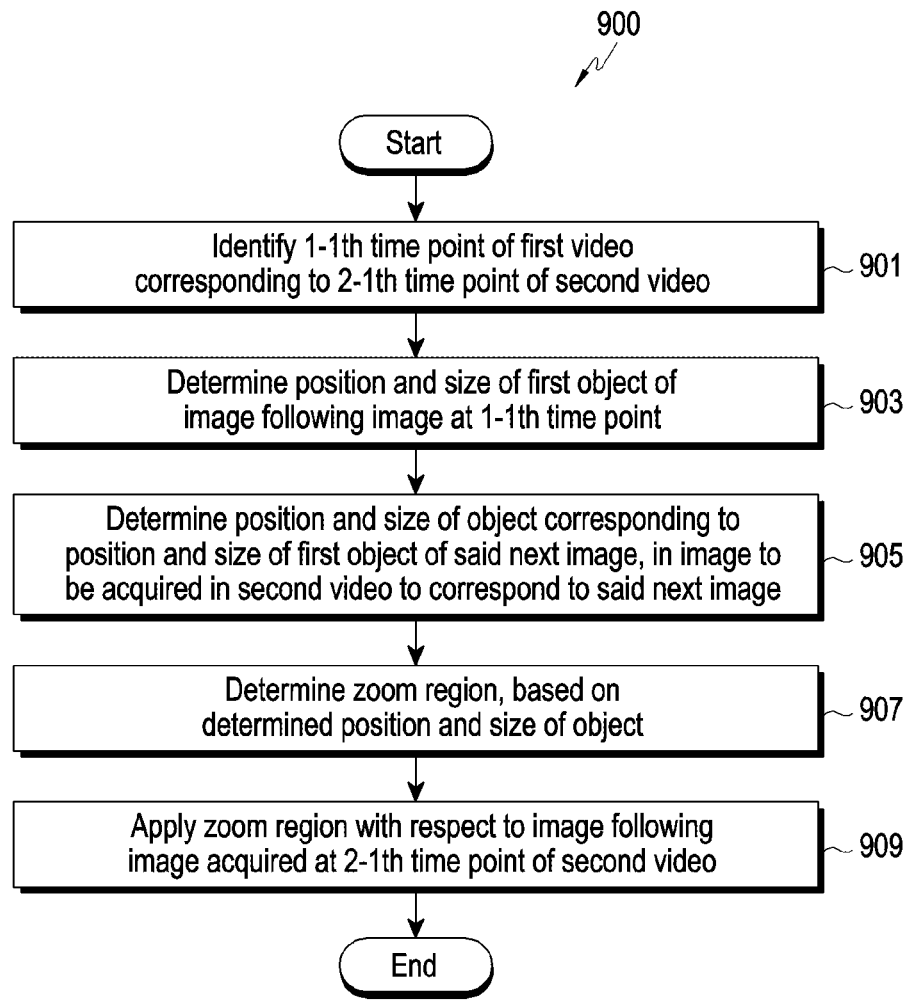
FIG. 9 is a flowchart illustrating an example method for applying a parameter related to a zoom region to be applied to a second video, using a first video, according to various embodiments.

FIG. 9 is a flowchart 900 for explaining an example method for applying a parameter related to a zoom region to be applied to a second video using a first video, according to various embodiments.

Figure 10:
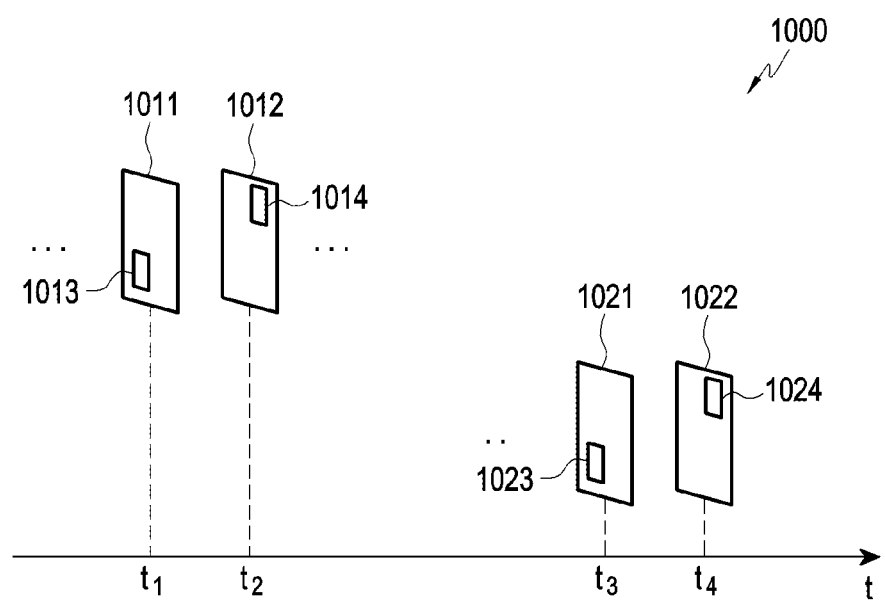
FIG. 10 is a diagram for explaining an example method for applying a parameter related to a zoom region to be applied to a second video, using a first video, according to various embodiments.

FIG. 10 is a diagram 1000 for explaining an example method for applying a parameter related to a zoom region to be applied to a second video using a first video, according to various embodiments.

Referring to FIGS. 9 and 10, in operation 901, according to an example embodiment, the processor 120 may identify a (1-1)th time point of the first video corresponding to a (2-1)th time point of the second video (e.g., the current time point of the second video). For example, in FIG. 10, the processor 120 may identify a (1-1)th time point (t1) of the first video corresponding to a (2-1)th time point (t3) of the second video. The operation of identifying the (1-1)th time point of the first video corresponding to the (2-1)th time point of the second video may be understood as an operation of synchronizing the second video and the first video.

In an embodiment, the processor 120 may compare the position (or change in position) of the second object at the (2-1)th time point of the second video with the positions (or change in positions) of the first objects in the first video, thereby identifying the (1-1)th time point corresponding to the (2-1)th time point.

In an embodiment, the processor 120 may identify the position (or change in position) of the second object 1023 included in the image 1023 at the (2-1)th time point of the second video. The processor 120 may identify, from among the plurality of images in the first video, the first object 1013 included in the image 1011 in the first video corresponding to the position of the second object 1023 at the (2-1)th time point of the second video. For example, the processor 120 may identify a change (e.g., displacement) in the position of the first object included in the designated number of images before the image 1023. The processor 120 may determine the (1-1)th time point (t1) of the image 1013 including the second object, the position of which has changed (e.g., has moved) in the first video to correspond to the change in the position of the first object (e.g., be similar to the change in the position of the first object). However, the disclosure is not limited in this respect, and the processor 120 may identify a time point (e.g., a time point after the first time as the start time point of the first video) based on the start time point of the first video, corresponding to the (2-1)th time point (t3) (e.g., a time point after the first time from the start time point (e.g., the capturing time point) of the second video) of the second video based on the start time point (e.g., the capturing time point) of the second video. In a case in which the position of the second object at the (2-1)th time point corresponds to the position of the first object at the time point of the first video based on the start time point of the first video, the processor 120 may determine, as the (1-1)th time point (t1), a time point based on the start time point of the first video.

In an embodiment, the processor 120 may identify a (1-1)th time point corresponding to a (2-1)th time point, based on a time of the second video and a time of the first video. For example, the processor 120 may determine, as the (1-1)th time point (t1), a time point (e.g., a time point after a first time as the start time point of the first video) based on the start time point of the first video, corresponding to the (2-1)th time point (t3) (e.g., a time point after the first time from the start time point (e.g., the capturing time point) of the second video) of the second video based on the start time point (e.g., the capturing time point) of the second video.

In an embodiment, the processor 120 may identify a (1-1)th time point corresponding to a (2-1)th time point, based on an audio signal.

In an embodiment, while the second video is acquired through the camera module 180, the processor 120 may acquire an audio signal (e.g., an audio signal related to music) through a microphone (e.g., the input module 150). The processor 120 may identify a waveform of the acquired audio signal and/or energy of the audio signal.

In an embodiment, the processor 120 may identify correlation between the acquired audio signal and the audio signal of the first video, based on the waveform of the acquired audio signal and the waveform of the audio signal of the first video. The processor 120 may identify a waveform of the audio signal acquired for a designated time point before the (2-1)th time point and a time section of the first video having a high correlation (e.g., having a correlation greater than or equal to a designated value). The processor 120 may determine the last time point of the time section of the first video as the (1-1)th time point (t1) corresponding to the (2-1)th time point (t3).

In an embodiment, the processor 120 may identify energy of the acquired audio signal and energy of the audio signal of the first video as corresponding audio signals (e.g., an audio signal for the same music), based on the energy of the acquired audio signal and the energy of the audio signal of the first video. The processor 120 may identify a time section of the first video in which energy of an audio signal of the first video is acquired, the energy having the difference of a designated value or less with respect to the energy of the audio signal acquired in the time section before the (2-1)th time point. The processor 120 may determine the last time point of the time section of the first video as the (1-1)th time point (t1) corresponding to the (2-1)th time point (t3).

In an embodiment, the processor 120 may identify the first object corresponding to the second object, based on at least one of a time, a beat, a rhythm, and a tempo of the acquired audio signal. For example, the processor 120 may recognize at least one of a time, a beat, a rhythm, and a tempo of the acquired audio signal at the (2-1)th time point of the second video. The processor 120 may identify a time point at which at least one of a time, a beat, a rhythm, or a tempo corresponding to at least one of a time, a beat, a rhythm, and a tempo of the audio signal acquired in the first video is recognized as the (1-1)th time point of the first video corresponding to (or in sync with) the (2-1)th time point of the second video.

In an embodiment, the processor 120 may identify the first object corresponding to the second object, based on the voice signal included in the acquired audio signal. For example, the processor 120 may recognize a voice signal (e.g., a user's voice signal) included in the acquired audio signal at the (2-1)th time point of the second video, for example, using a voice recognition module. The processor 120 may identify, as the (1-1)th time point of the first video corresponding to the (2-1)th time point of the second video, a time point at which a voice signal corresponding to the voice signal included in the audio signal acquired in the first video is recognized.

In an embodiment, the processor 120 may identify the first object corresponding to the second object, based on noise (e.g., ambient noise or white noise) included in the acquired audio signal. For example, the processor 120 may recognize the noise included in the acquired audio signal at the (2-1)th time point of the second video. The processor 120 may identify, as a (1-1)th time point of the first video corresponding to the (2-1)th time point of the second video, a time point at which a voice signal corresponding to noise included in the audio signal acquired in the first video is recognized.

In operation 903, according to an embodiment, the processor 120 may determine the position and size of the first object in a next image of the image at the (1-1)th time point of the first video. For example, in FIG. 10, the processor 120 may determine the position and size of the first object 1014 of the image 1012 as the next image (e.g., a next image frame) of the image 1011.

Operation 903 and FIG. 10 show that the position and size of the first object 1014 included in the image 1012 as the next image (e.g., the next image frame) of the image 1011 are determined, but the disclosure is not limited in this respect.

In an embodiment, the processor 120 may determine the position and size of the first object in the image at the (1-2)th time point as a time point following the (1-1)th time point (t1). In an embodiment, the processor 120 may determine the (1-2)th time point of the first video in consideration of the frame rate of the first video and the frame rate of the second video.

In operation 905, in an embodiment, the processor 120 may predict the position and size of an object corresponding to the position and size of the first object in the next image (e.g., the image 1012) within the image to be acquired in the second video to correspond to the next image (e.g., the image 1012) of the first video.

For example, the processor 120 may determine the position and size (e.g., the position and size of the object 1024 predicted to be included in the image 1022 at the (2-2)th time point (t4)) of the object 1024 to be included in the image 1022 at the (2-2)th time point (t4) of the second video corresponding to the (1-2)th time point (t2) of the first video, based on the position and size of the first object 1014 in the image 1012. The processor 120 may determine the (2-2)th time point (t4) of the second video by adding the difference between the (1-2)th time point (t2) and the (1-2)th time point (t1) to the (2-1)th time point (e.g., the current time point) of the second video.

In operation 907, in an embodiment, the processor 120 may determine a zoom region, based on the determined position and size of an object. For example, the processor 120 may determine a zoom region of the determined object 1024 (e.g., the determined position and size of the object 1024) using a parameter related to the zoom region (e.g., a default parameter related to the zoom region).

In operation 909, according to an embodiment, the processor 120 may apply the determined zoom region with respect to an image following the image acquired at the (2-1)th time point of the second video. For example, the processor 120 may apply the determined zoom region with respect to the second object included in the next image (acquired through the camera module 180 (or stored in the memory 130 after being acquired through the camera module 180) after the (2-1)th time point (t3)) of the image 1021 of the second video.

In an embodiment, the processor 120 may acquire a video by repeatedly performing operations 901 to 909.

In an embodiment, the processor 120 may acquire a video by repeatedly performing operations 903 to 909, except for operation 901, after performing operations 901 to 909. For example, in a case in which the frame rate of the first video and the frame rate of the second video are the same, the processor 120 may perform operation 901 such that the time point of the first video and the time point of the second video are synchronized, and accordingly, operation 901 may not need to be performed again in the subsequent operations.

In an embodiment, although not shown in FIG. 9, in a case in which the (1-1)th time point of the first video corresponding to the (2-1)th time point of the second video (e.g., the current time point of the second video) cannot be identified in operation 901, the processor 120 may acquire a video, based on the method described with reference to FIG. 7 or FIG. 8. For example, after the time point of the first video and the time point of the second video are synchronized, the subject corresponding to the second object in the second video may move differently from the subject corresponding to the first object in the first video for a designated time (e.g., in a case in which the subject corresponding to the second object dances differently from the subject corresponding to the first object). In a case in which the (1-1)th time point of the first video corresponding to the (2-1)th time point of the second video (e.g., the current time point of the second video) cannot be identified for a designated time or the position (and size) of the second object in the second video is identified as being changed differently from the position (and size) of the first object in the first video for the designated time, the processor 120 may acquire a video by applying a default parameter related to a zoom region with respect to the second video in the method described with reference to FIG. 7 or FIG. 8.

Figure 11:
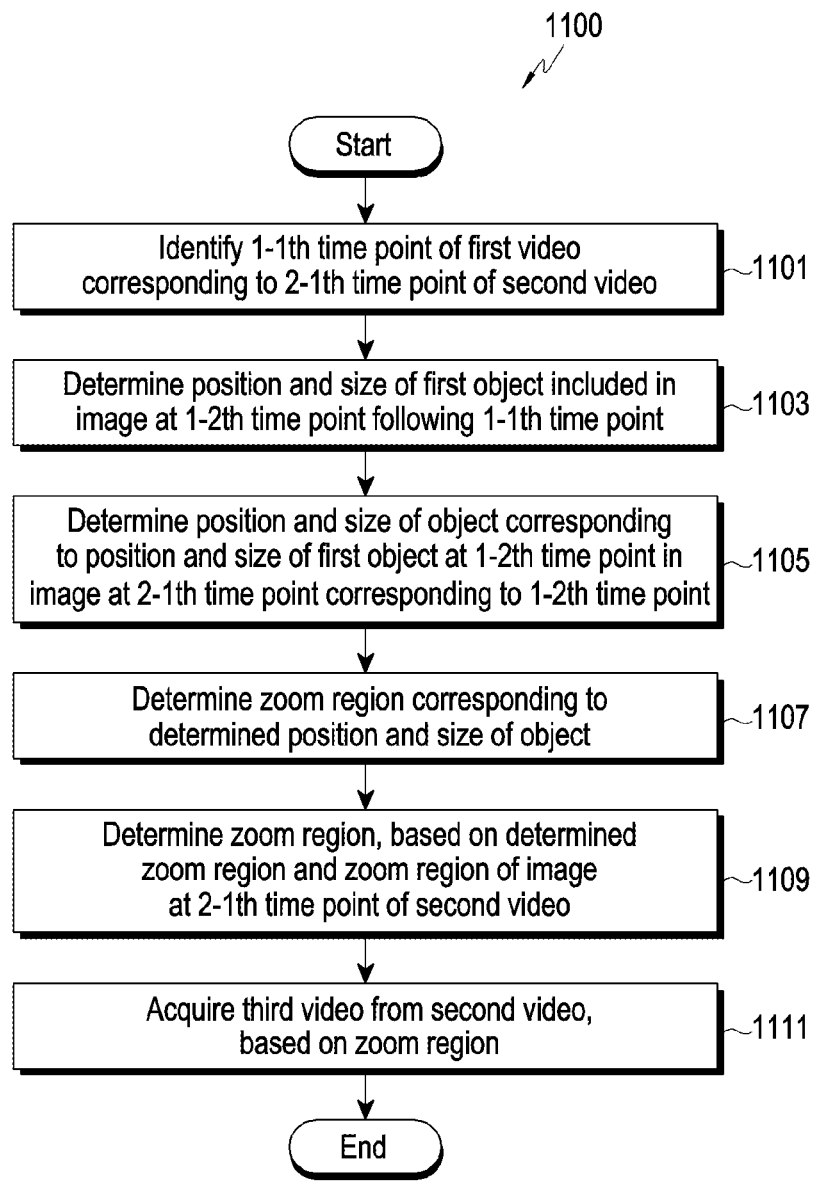
FIG. 11 is a flowchart illustrating an example method for applying a parameter related to a zoom region to be applied to a second video, using a first video, according to various embodiments.

FIG. 11 is a flowchart 1100 for explaining an example method for applying a parameter related to a zoom region to be applied to a second video using a first video, according to various embodiments.

Figure 12:
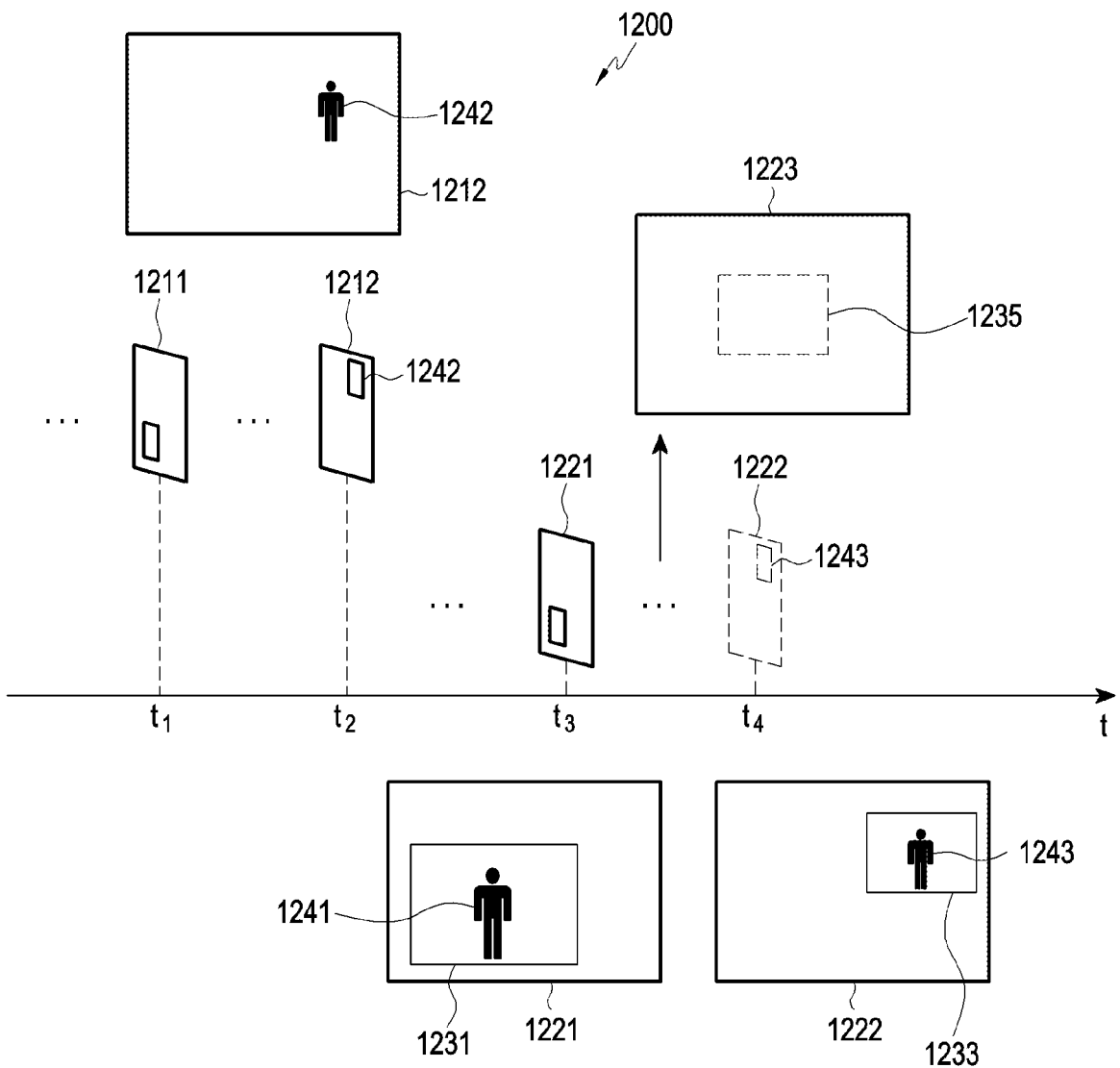
FIG. 12 is a diagram for explaining an example method for applying a parameter related to a zoom region to be applied to a second video, y using a first video, according to various embodiments.

FIG. 12 is a diagram 1200 for explaining an example method for applying a parameter related to a zoom region to be applied to a second video using a first video, according to various embodiments.

Referring to FIGS. 11 and 12, in an embodiment, the processor 120 may identify the (1-1)th time point of the first video corresponding to the (2-1)th time point of the second video (e.g., the current time point of the second video) in operation 1101. For example, in FIG. 12, the processor 120 may identify the (1-1)th time point (t1) of the first video corresponding to the (2-1)th time point (t3) of the second video.

Since the operation 1101 of identifying the (1-1)th time point of the first video corresponding to the (2-1)th time point of the second video is at least partially the same as or similar to operation 901 of FIG. 9, a detailed description thereof will not be repeated.

According to an embodiment, the processor 120 may determine the position and size of the first object included in the image at the (1-2)th time point following the (1-1)th time point of the first video in operation 1103. For example, in FIG. 12, the processor 120 may determine the position and size of the first object 1242 included in the image 1212 at the (1-2)th time point (t2) as the next time point after the (1-1)th time point (t1).

According to an embodiment, the (1-2) the time point t2 of the first video may be a time point in consideration of the frame rate of the first video and the frame rate of the second video from the (1-1)th time point (t1) of the first video (e.g., the time point at which the image 1211 is acquired), the time required to detect the second object in each of the plurality of images in the second video, and the time required to determine (e.g., predict) a zoom region in operation 1109, which will be described later.

In an embodiment, in operation 1105, the processor 120 may determine (e.g., predict) the position and size of the object corresponding to the position and size of the first object at the (1-2)th time point, within the image at the (2-1)th time point of the second video corresponding to the (1-2)th time point of the first video.

In an embodiment, the processor 120 may determine the position and size of the object 1243, which is predicted to be included in the image 1222 at the (2-2)th time point (t4) of the second video corresponding to the (1-2)th time point of the first video, based on the position and size of the first object 1242 included in the image 1212 at the (1-2)th time point of the first video. The processor 120 may determine the (2-2)th time point (t4) of the second video by adding the difference between the (1-2)th time point (t2) and the (1-2)th time point (t1) to the (2-1)th time point (e.g., the current time point) of the second video.

In an embodiment, the processor 120 may determine the zoom region corresponding to the determined position and size of the object in operation 1107. For example, the processor 120 may determine the zoom region 1233 (e.g., the position and size of the zoom region 1233) of the determined object 1243 (e.g., the determined position and size of the object 1243) using the parameter related to the zoom region (e.g., the default parameter related to the zoom region).

In one embodiment, the processor 120 may determine the size of the zoom region 1233 of the (2-2)th time point in consideration of the sizes of the first object included in the plurality of images acquired during a time period from a time point before the first time with reference to the (1-1)th time point (t1) of the first video to a time point after the second time with reference to the (1-1)th time point (t1) of the first video. For example, the processor 120 may apply a padding region of the default parameter with respect to the region (e.g., the region including the first object) (or the region of the second object obtained by matching (mapping) the region of the first object of the largest size to the second video, based on the ratio between the first video and the second video area of the object) of the first object of the largest size among the sizes of the first object included in the plurality of images, thereby determining (e.g., adjusting) the size of the zoom region 1233 of the (2-2)th time point. In this case, the size of the target zoom regions to be described later in operation 1109 may be determined to be larger (or more spacious) than the size of the target zoom regions to which only the padding region of the default parameter is applied, and a video with less shaking may be obtained from the second video.

In an embodiment, the processor 120 may determine, in operation 1109, a zoom region to be applied to a plurality of images to be acquired between the (2-1)th time point and the (2-2)th time point, based on the determined zoom region and the zoom region of the image at the (2-1)th time point of the second video.

In an embodiment, the processor 120 may determine the zoom region 1231 of the second object 1241 included in the image 1221 at the (2-1)th time point. The processor 120 may acquire a parameter related to a plurality of zoom regions (hereinafter, "target zoom regions") to be applied to a plurality of images (e.g., the image 1223) to be acquired at a time between the (2-1)th time point and the (2-2)th time point), based on the zoom region 1231 and the determined zoom region 1233 at the (2-2)th time point.

In an embodiment, the processor 120 may determine parameters related to the movement speed and size of the target zoom regions using Equation 1 described with reference to FIG. 8. For example, in a case in which [Equation 1] is applied to the embodiment of FIG. 12, in [Equation 1], $B_1$ may denote the position and size of the zoom region 1231 of the image 1221, and $B_2$ may denote the position and size of the zoom region 1233. With respect to [Equation 1] applied to the embodiment of FIG. 12, in order to avoid overlap with the description of FIG. 8, a detailed description thereof will not be repeated.

In an embodiment, the processor 120 may determine target zoom regions (e.g., the position and sizes of target zoom regions) using [Equation 2] described with reference to FIG. 8. In a case in which [Equation 2] is applied to the embodiment of FIG. 12, in [Equation 2], $B_1$ may denote the position and size of the zoom region 1231 of the image 1221, and $B_2$ may denote the position and size of the zoom region 1233 of the image 1223. With respect to [Equation 2] applied to the embodiment of FIG. 12, in order to avoid overlap with the description of FIG. 8, a detailed description thereof will not be repeated.

In an embodiment, the processor 120 may acquire a third video from the second video, based on the zoom region (e.g., target zoom regions) in operation 1111. For example, while a plurality of images (e.g., the image 1223) are acquired through the camera module 180, the processor 120 may acquire the third video by applying the position and size of each of the target zoom regions (e.g., a zoom region 1235) with respect to the plurality of images. For example, the processor 120 may acquire the third video by performing cropping on each of the plurality of images included in the second video, based on the positions and sizes of target zoom regions.

FIG. 11 describes that after the position and size of the object corresponding to the position and size of the first object at the (1-1)th time point are determined in the image at the (2-1)th time point of the second video, a zoom region corresponding to the determined position and size of the object is determined, but the disclosure is not limited in this respect. For example, the processor 120 may also determine a zoom region of the first object, based on the position and size of the first object at the (1-2)th time point of the first video and then determine a zoom region at the (2-2)th time point of the second video corresponding to the zoom region of the determined first object.

Figure 13:
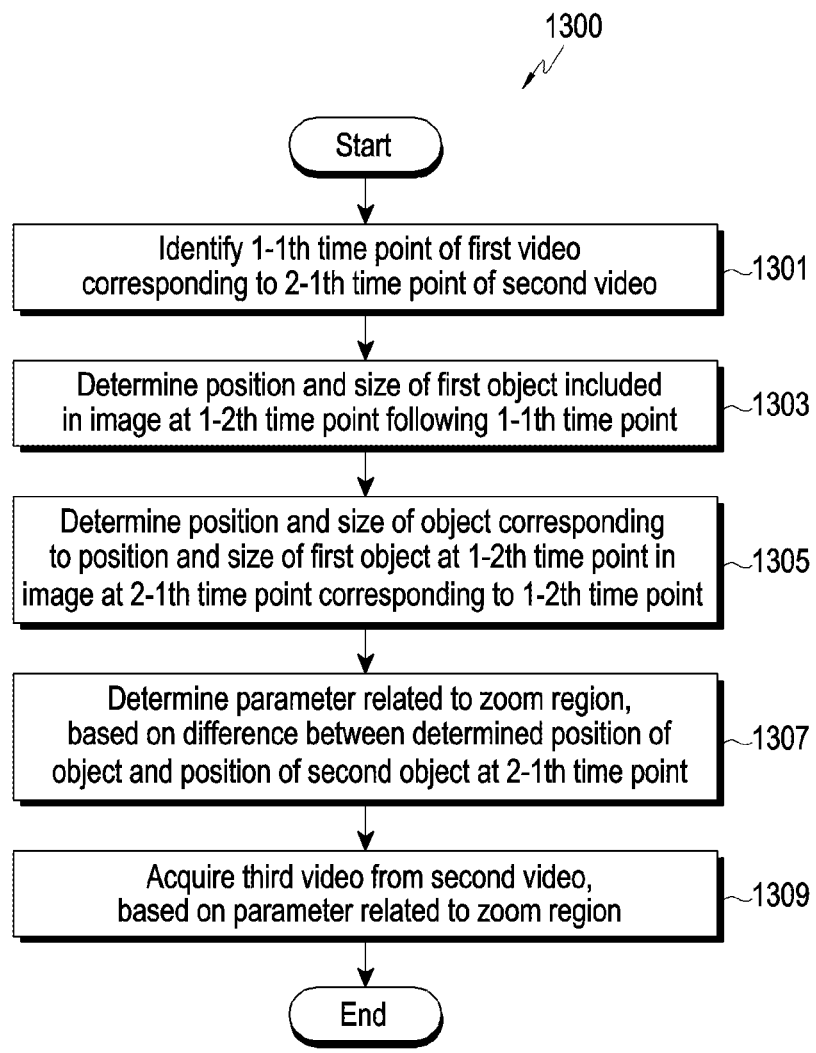
FIG. 13 is a flowchart illustrating an example method for applying a parameter related to a zoom region to be applied to a second video, using a first video, according to various embodiments.

FIG. 13 is a flowchart 1300 for explaining an example method for applying a parameter related to a zoom region to be applied to a second video using a first video, according to various embodiments.

Figure 14:
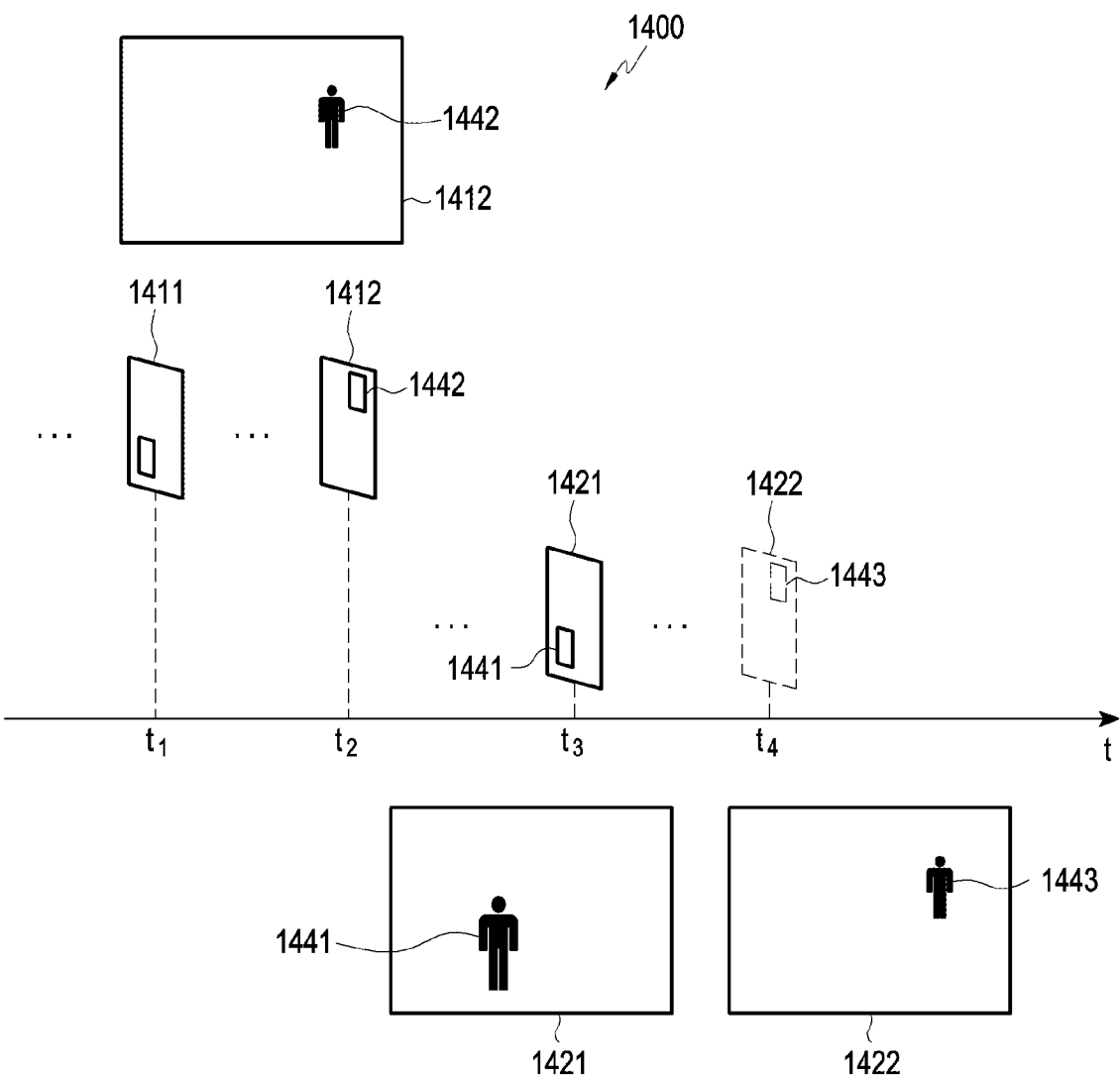
FIG. 14 is a diagram for explaining an example method for applying a parameter related to a zoom region to be applied to a second video, using a first video, according to various embodiments.

FIG. 14 is a diagram 1400 for explaining an example method for applying a parameter related to a zoom region to be applied to a second video using a first video, according to various embodiments.

Referring to FIGS. 13 and 14, in an embodiment, the processor 120 may identify the (1-1)th time point of the first video corresponding to the (2-1)th time point of the second video (e.g., the current time point of the second video) in operation 1301. For example, in FIG. 14, the processor 120 may identify the (1-1)th time point (t1) of the first video corresponding to the (2-1)th time point (t3) of the second video.

Since the operation 1301 of identifying the (1-1)th time point of the first video corresponding to the (2-1)th time point of the second video is at least partially the same as or similar to operation 901 of FIG. 9 and operation 1201 of FIG. 12, a detailed description thereof will not be repeated.

According to an embodiment, the processor 120 may determine the position and size of the first object included in the image at the (1-2)th time point following the (1-1)th time point of the first video in operation 1303. For example, in FIG. 14, the processor 120 may determine the position and size of the first object 1442 included in the image 1412 at the (1-2)th time point (t2) as a time point following the (1-1)th time point (t1) (e.g., the time point at which the image 1411 is acquired).

In an embodiment, in operation 1305, the processor 120 may determine (e.g., predict) the position and size of an object corresponding to the position and size of the first object at the (1-2)th time point within the image at the (2-1)th time point of the second video corresponding to the (1-2)th time point of the first video.

In an embodiment, the processor 120 may determine the position and size of the object 1443, which is predicted to be included in the image 1422 at the (2-2)th time point (t4) of the second video corresponding to the (1-2)th time point of the first video, based on the position and size of the first object 1442 included in the image 1412 at the (1-2)th time point of the first video. The processor 120 may determine the (2-2)th time point (t4) by adding the difference between the (1-2)th time point (t2) and the (1-2)th time point (t1) to the (2-1)th time point (e.g., the current time point) of the second video.

In an embodiment, the processor 120 may determine a parameter related to the zoom region, in operation 1307, based on the difference between the position and size of the second object at the (2-1)th time point and the determined position and size of the object.

In an embodiment, the processor 120 may determine the position and size of the second object 1441 included in the image 1421 at the (2-1)th time point of the second video. The processor 120 may adjust the movement speed of a zoom region of a parameter (e.g., a default parameter) related to the zoom region such that the greater the difference between the position of the second object 1441 and the position of the object 1443 is, the greater (e.g., faster) the movement speed of the zoom region is. The processor 120 may adjust the movement speed of a zoom region of a parameter (e.g., a default parameter) related to the zoom region such that the smaller the difference between the position of the second object 1441 and the position of the object 1443 is, the smaller (e.g., slower) the movement speed of the zoom region is. The processor 120 may consider the size of the second object 1441 and the size of the object 1443 when adjusting a movement speed of the zoom region of a parameter (e.g., a default parameter) related to the zoom region.

In an embodiment, the processor 120 may acquire a third video from the second video in operation 1309, based on a parameter related to a zoom region.

In an embodiment, the processor 120 may apply the parameter related to the zoom region determined in operation 1307 with respect to images to be acquired from the (2-1)th time point (t3) to the (2-2)th time point (t4).

In an embodiment, the processor 120 may apply a parameter related to the zoom region to which a default parameter is adjusted, with respect to the images to be acquired from the (2-1)th time point (t3) to the (2-2)th time point (t4), thereby acquiring a third video from the second video.

Figure 15:
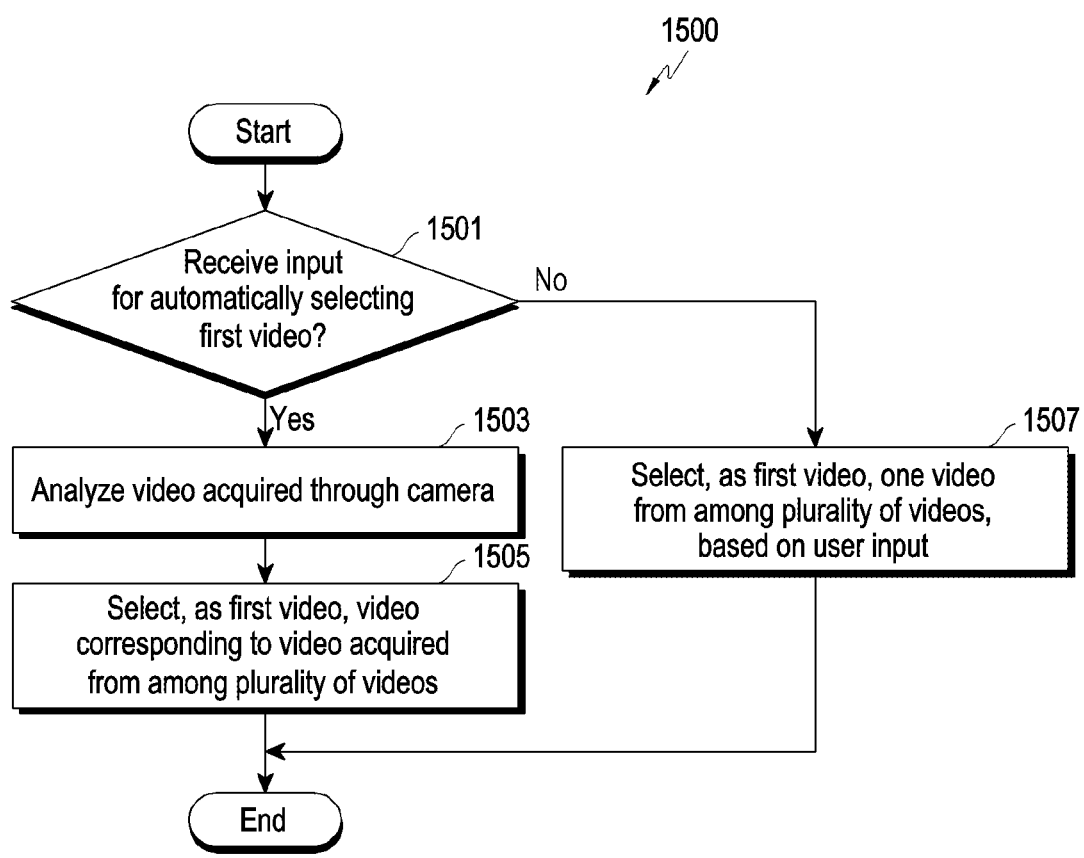
FIG. 15 is a flowchart illustrating an example method for acquiring a first video by selecting the first video from among a plurality of videos, according to various embodiments.

FIG. 15 is a flowchart 1500 illustrating an example method for acquiring a first video by selecting a first video from among a plurality of videos, according to various embodiments.

Referring to FIG. 15, in an embodiment, in operation 1501, the processor 120 may identify whether an input for automatically selecting a first video (e.g., in a designated manner) is received. The input for automatically selecting the first video may include, for example, an input through a user interface (e.g., checkbox) for receiving a user input for automatically selecting the first video or setting information (e.g., flag type information) for automatically selecting the first video. For example, the processor 120 may receive the user input through a user interface included in the camera application before the start of capturing an image or receive the user information through preconfigured setting information.

In an embodiment, in a case in which an input for automatically selecting the first video is received in operation 1501, the processor 120 may analyze a video acquired (e.g., being acquired) through the camera module 180 in operation 1503.

In an embodiment, in a case in which an input for automatically selecting the first video is received, the processor 120 may display a preview through a display (e.g., the display module 160), based on the plurality of images acquired through the camera module 180. In an embodiment, the processor 120 may analyze the screen composition and/or background of the preview obtained through the camera module 180. In an embodiment, the processor 120 may analyze at least one object included in the preview obtained through the camera module 180.

In an embodiment, the processor 120 may select, as a first video, a video corresponding to the video analyzed in operation 1503 from among the plurality of videos stored in the memory 130 in operation 1505. For example, the processor 120 may analyze the background and/or screen composition of the images for a designated time period from the starting point with respect to each of the plurality of videos stored in the memory 130. The processor 120 may select, as a first video, an image having a background and/or screen composition similar to the background and/or screen composition of the video (e.g., a preview) analyzed in operation 1503, from among the plurality of videos stored in the memory 130. As another example, the processor 120 may analyze an object included in the images for a designated time period from the starting point with respect to each of the plurality of videos stored in the memory 130. The processor 120 may select, as a first video, a video including an object similar to an object of the video (e.g., a preview) analyzed in operation 1503, from among the plurality of videos stored in the memory 130. However, the method for automatically selecting the first video from among the plurality of videos stored in the memory 130 is not limited to the above-described examples.

In an embodiment, in a case in which an input for automatically selecting the first video is not received in operation 1501, the processor 120 may select one video among a plurality of videos as the first video, based on a user input in operation 1507. For example, the processor 120 may receive a user input for selecting one video from among a plurality of videos. The processor 120 may determine the selected video as the first video, based on the user input.

Figure 16:
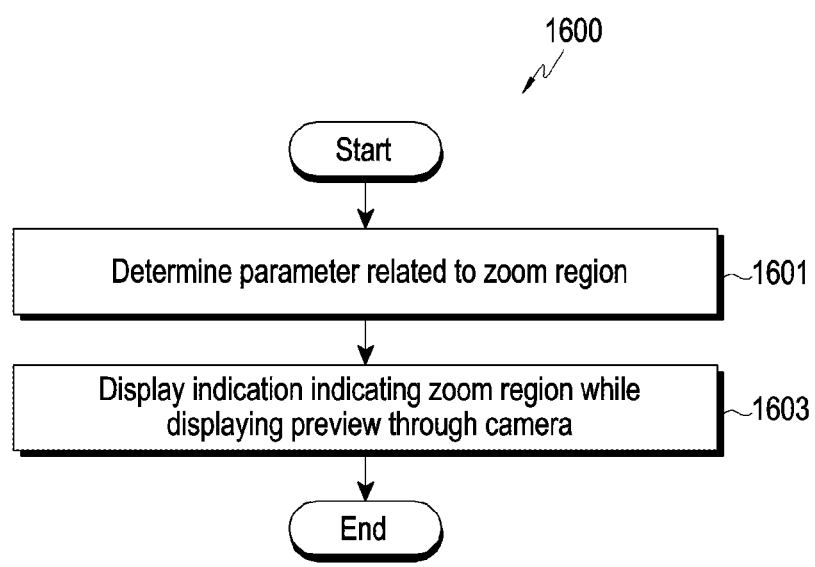
FIG. 16 is a flowchart illustrating an example method for applying a parameter related to a zoom region with respect to an object corresponding to a subject while a preview is displayed, according to various embodiments.

FIG. 16 is a flowchart 1600 illustrating an example method for applying a parameter related to a zoom region with respect to an object corresponding to a subject while a preview is displayed, according to various embodiments.

In one embodiment, FIG. 16 may relate to a method including, after acquiring a parameter related to a zoom region (e.g., a default parameter) (e.g., after performing operation 403 of FIG. 4), applying the parameter related to the acquired zoom region to a preview to enable a user to identify whether the parameter related to the zoom region desired by the user is acquired.

Referring to FIG. 16, in an embodiment, the processor 120 may determine a parameter (e.g., a default parameter) related to a zoom region in operation 1601.

In an embodiment, in operation 1603, the processor 120 may display an indication indicating a zoom region while displaying a preview through a display (e.g., the display module 160), based on the plurality of images acquired through the camera module 180.

In an embodiment, in a case in which an object is detected while displaying a preview, the processor 120 may apply a default parameter with respect to the detected object. While applying the default parameter with respect to the detected object, the processor 120 may display an indication indicating the boundary (e.g., four rectangle lines in case that the zoom region has a rectangle shape).

In an embodiment, the user may identify whether a parameter related to the zoom region desired by the user has been obtained, through movement and size change of an indication indicating the boundary of the zoom region in the preview to which a default parameter is applied. In an embodiment, in a case in which the parameter related to the zoom region desired by the user is not obtained, the processor 120 may obtain a parameter related to the zoom region desired by the user by adjusting the parameter related to the zoom region, based on a user input.

In an embodiment, the processor 120 may differently configure the display of the preview video and/or the indication indicating a zoom region, based on the state of the electronic device 101. For example, the electronic device 101 may be a foldable electronic device or an extendable (or rollable, slidable) electronic device. For example, in a case in which the electronic device 101 is a foldable electronic device, the screen display region may be reduced in the folded state of the electronic device 101. The processor 120 may detect the state of the electronic device 101 through at least one sensor (e.g., a hall sensor), and may adjust the size of a preview video, based on the size of the screen display region, in a case in which the electronic device 101 is folded. The processor 101 may display an indication indicating a zoom region on the adjusted preview screen. As another example, in a case in which the electronic device 101 is folded, the processor 120 may adjust (e.g., crop) a preview video, based on a zoom region. For example, the processor 120 may adjust the preview video such that the zoom region indication is maximally included in the preview video. For example, the processor 120 may adjust the preview video such that only a space (e.g., 10 px) of top/bottom or left/right of the region other than the zoom region, which has a designated size, is included in the preview video. In this case, the zoom region may be displayed in the center region of the display region.

A method for providing a video in the electronic device 101 according to various embodiments of the disclosure may include acquiring a first video, identifying a first object in the first video, acquiring a parameter related to a zoom region, based on the movement of the first object in the first video, identifying the first object corresponding to a second object included in a second video acquired through a camera module 180 of the electronic device 101, and acquiring a video of the second object from the second video, based on the parameter related to the zoom region.

In various embodiments, the acquiring of the video may include determining the zoom region related to the second object from the second video, based on a parameter related to the zoom region.

In various embodiments, the parameter related to the zoom region may include at least one of a threshold value related to movement of the zoom region, an average movement speed of the zoom region, or a padding region of the zoom region.

In various embodiments, the acquiring of the video may include determining the size of the zoom region, based on the padding region, and in a case in which the second object moves by the threshold value or more, moving the zoom region, based on the average movement speed.

In various embodiments, the identifying of the first object may include identifying an object at a position corresponding to the position of the second object as the first object in the first video.

In various embodiments, the identifying of the first object may include identifying, in the second video, a first time corresponding to the second object, and identifying the first object corresponding to a second time of the first video, based on the identified first time.

In various embodiments, the identifying of the first object may include acquiring an audio signal through a microphone (e.g., the input module 150) of the electronic device 101, identifying the second time corresponding to the first time, based on the audio signal and an audio signal included in the first video, and identifying, as the first object, an object included in the first video at the second time.

In various embodiments, the identifying of the second time corresponding to the first time may include recognizing at least one of a time, a beat, a rhythm, or a tempo of the acquired audio signal, and identifying the second time corresponding to the first time, based on at least one of the recognized time, beat, rhythm or tempo.

In various embodiments, the identifying of the second time corresponding to the first time may include recognizing a voice signal included in the acquired audio signal, and identifying the second time corresponding to the first time, based on the recognized voice signal.

In various embodiments, the identifying of the first object in the first video may further include identifying whether the first video includes a plurality of objects, and in a case in which the first video includes the plurality of objects, identifying the first object corresponding to the second object from among the plurality of objects.

In various embodiments, the acquiring of the video may include identifying a second time point of the first video corresponding to a first time point of the second video, determining a position and size of the first object included in the first video at a third time point after the second time point of the first video, determining a position and size of the zoom region, based on the determined position and size of the first object and a parameter related to the zoom region, and acquiring a video related to the second object from the second video, based on the determined position and size of the zoom region.

In various embodiments, the method may further include determining the sizes of the first object included in each of the plurality of images of the first video having been acquired during a time from a time point before a first time with reference to the second time point of the first video to a time point after a second time with reference to the second time point, wherein the determining of the position and size of the zoom region may include acquiring a video related to the second object from the second video, based on the determined position and size of the zoom region.

In various embodiments, the identifying of a second time point of the first video corresponding to a first time point of the second video may include identifying the second time point corresponding to the first time point, based on the position of the second object and the position of the first object, or at least one of an audio signal acquired through a microphone of the electronic device 101 and an audio signal included in the first video.

In various embodiments, the method may include adjusting the setting of the camera module 180, based on a parameter related to the zoom region, and controlling the camera module 180, based on the adjusted setting of the camera module 180, in order to acquire a video of the second object.

In addition, the structure of the data used in the above-described embodiment of the disclosure may be recorded in a non-transitory computer-readable recording medium through various means. The computer-readable recording medium includes a storage medium, such as a magnetic storage medium (e.g., a ROM, a floppy disk, a hard disk, etc.) and an optically readable medium (e.g., a CD-ROM, a DVD, etc.).

A computer-readable recording medium in which programs executable by a computer are recorded may record a program for executing acquiring a first video in the electronic device 101, identifying a first object in the first video, acquiring a parameter related to a zoom region, based on the movement of the first object in the first video, identifying the first object corresponding to a second object included in a second video acquired through the camera module 180 of the electronic device 101, and acquiring a video of the second object from the second video, based on the parameter related to the zoom region.

The disclosure has been described with a focus on preferred embodiments thereof. Those of ordinary skill in the art to which the disclosure pertains will understand that the disclosure can be implemented in a modified form without departing from the essential characteristics of the disclosure. Therefore, the disclosed embodiments are to be considered in an illustrative rather than a restrictive point of view. The scope of the disclosure is indicated in the claims rather than the foregoing description, and all differences within the scope equivalent thereto should be construed as being included in the disclosure.

What is claimed is:

1. An electronic device comprising:
a camera module including a camera;
at least one processor including processing circuitry; and
memory storing instructions that, when executed by the at least one processor individually or collectively, cause the electronic device to:
acquire a first video from the memory,
identify a first object in the first video,
acquire a parameter related to a zoom region to be applied to a video acquired through the camera module, based on movement of the first object in the first video, wherein the parameter includes at least one of a threshold value related to movement of the zoom region, an average movement speed of the zoom region, or a padding region of the zoom region,
after acquiring the parameter related to the zoom region, acquire a second video through the camera module,
while the second video is acquired through the camera module, identify the first object as corresponding to a second object included in the second video,
determine a zoom region for the second object in the second video by applying the parameter to the second video, and
acquire a third video of the second object from the second video, by cropping the zoom region for the second object in the second video.

2. The electronic device of claim 1,
wherein the instructions, when executed by the at least one processor individually or collectively, cause the electronic device to:
determine a size of the zoom region for the second object, based on the padding region, and
when the second object moves by the threshold value or more, move the zoom region for the second object, based on the average movement speed.

3. The electronic device of claim 1, wherein the instructions, when executed by the at least one processor individually or collectively, cause the electronic device to identify an object at a position corresponding to a position of the second object as the first object in the first video.

4. The electronic device of claim 1, wherein the instructions, when executed by the at least one processor individually or collectively, cause the electronic device to:
identify a first time corresponding to the second object in the second video, and
identify the first object corresponding to a second time of the first video, based on the identified first time.

5. The electronic device of claim 4, further comprising a microphone,
wherein the instructions, when executed by the at least one processor individually or collectively, cause the electronic device to:
acquire an audio signal through the microphone,
identify the second time corresponding to the first time, based on the audio signal and an audio signal included in the first video, and
identity an object included in the first video at the second time as the first object.

6. The electronic device of claim 5, wherein the instructions, when executed by the at least one processor individually or collectively, cause the electronic device to recognize at least one of a time, a beat, a rhythm, or a tempo of the acquired audio signal, and identify the second time corresponding to the first time, based on at least one of the recognized time, beat, rhythm, or tempo.

7. The electronic device of claim 5, wherein the instructions, when executed by the at least one processor individually or collectively, cause the electronic device to recognize a voice signal included in the acquired audio signal, and identify the second time corresponding to the first time, based on the recognized voice signal.

8. The electronic device of claim 1, wherein the instructions, when executed by the at least one processor individually or collectively, cause the electronic device to:
identify whether the first video includes a plurality of objects, and
based on identifying that the first video includes the plurality of objects, identify, among the plurality of objects, the first object as corresponding to the second object.

9. The electronic device of claim 1, wherein the instructions, when executed by the at least one processor individually or collectively, cause the electronic device to:
identify a second time point of the first video corresponding to a first time point of the second video,
determine a position and a size of the first object included in the first video at a third time point following the second time point of the first video,
determine a position and a size of the zoom region for the second object, based on the determined position and size of the first object and the parameter, and
acquire the third video of the second object from the second video, based on the determined position and size of the zoom region for the second object.

10. The electronic device of claim 9, wherein the instructions, when executed by the at least one processor individually or collectively, cause the electronic device to:
determine the sizes of the first objects included in a plurality of images of the first video, respectively, acquired during a time from a time point before a first time with reference to the second time point of the first video to a time point after a second time with reference to the second time point, and
determine the position and the size of the zoom region for the second object, based on the sizes of the first objects and the parameter.

11. The electronic device of claim 9, wherein the instructions, when executed by the at least one processor individually or collectively, cause the electronic device to:
identify the second time point corresponding to the first time point, based on the position of the second object and the position of the first object, or at least one of an audio signal acquired through a microphone of the electronic device or an audio signal included in the first video.

12. The electronic device of claim 1, wherein the instructions, when executed by the at least one processor individually or collectively, cause the electronic device to:
adjust a setting of the camera module, based on the parameter, and
control the camera module, based on the adjusted setting of the camera module, to acquire the third video of the second object.

13. A method for providing a video in an electronic device, the method comprising:
acquiring a first video from memory of the electronic device;
identifying a first object in the first video;
acquiring a parameter related to a zoom region to be applied to a video acquired through a camera module of the electronic device, based on movement of the first object in the first video, wherein the parameter includes at least one of a threshold value related to movement of the zoom region, an average movement speed of the zoom region, or a padding region of the zoom region;
after acquiring the parameter related to the zoom region, acquiring a second video through the camera module;
while the second video is acquired through the camera module, identifying the first object as corresponding to a second object included in the second video;
determining a zoom region for the second object in the second video by applying the parameter to the second video; and
acquiring a third video of the second object from the second video, by cropping the zoom region for the second object in the second video.

14. The method of claim 13,
wherein the acquiring of the third video comprises:
determining a size of the zoom region for the second object, based on the padding region; and
when the second object moves by the threshold value or more, moving the zoom region for the second object, based on the average movement speed.

15. The method of claim 13, wherein the identifying of the first object comprises identifying, in the first video, an object at a position corresponding to a position of the second object as the first object.

16. The method of claim 13, wherein the identifying of the first object comprises:
identifying, in the second video, a first time corresponding to the second object; and
identifying the first object corresponding to a second time of the first video, based on the identified first time.

17. The method of claim 16, wherein the identifying of the first object comprises:
acquiring an audio signal through a microphone of the electronic device;
identifying the second time corresponding to the first time, based on the audio signal and an audio signal included in the first video; and
identifying an object included in the first video at the second time as the first object.

18. The method of claim 13, wherein the acquiring of the third video comprises:
identifying a second time point of the first video corresponding to a first time point of the second video;
determining a position and a size of the first object included in the first video at a third time point after the second time point of the first video;
determining a position and a size of the zoom region for the second object, based on the determined position and size of the first object and a parameter related to the zoom region; and
acquiring the third video of the second object from the second video, based on the determined position and size of the zoom region for the second object.

* * * * *